United States Patent
Yamakawa et al.

(10) Patent No.: US 12,119,442 B2
(45) Date of Patent: Oct. 15, 2024

(54) METHOD FOR PRODUCING SULFIDE SOLID ELECTROLYTE

(71) Applicant: IDEMITSU KOSAN CO., LTD., Tokyo (JP)

(72) Inventors: Fumio Yamakawa, Ichihara (JP); Masao Aida, Ichihara (JP); Yusuke Iseki, Chiba (JP); Hiroaki Yamada, Chiba (JP); Shinji Tanaka, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 121 days.

(21) Appl. No.: 17/317,951

(22) Filed: May 12, 2021

(65) Prior Publication Data
US 2021/0408581 A1 Dec. 30, 2021

(30) Foreign Application Priority Data

May 13, 2020 (JP) .................................. 2020-084793
May 26, 2020 (JP) .................................. 2020-091347

(51) Int. Cl.
*H01M 10/0562* (2010.01)
*C01B 25/14* (2006.01)
(Continued)

(52) U.S. Cl.
CPC ......... *H01M 10/0562* (2013.01); *C01B 25/14* (2013.01); *H01M 10/052* (2013.01);
(Continued)

(58) Field of Classification Search
CPC ......... H01M 10/0562; H01M 10/0525; H01M 2300/0068
See application file for complete search history.

(56) References Cited

U.S. PATENT DOCUMENTS

2010/0200795 A1* 8/2010 Ota et al. ............ H01M 10/052
252/62.2
2016/0104916 A1* 4/2016 Seino et al. ...... H01M 10/0525
429/189
(Continued)

FOREIGN PATENT DOCUMENTS

JP 2014191899 A 10/2014
JP 2015207521 A * 11/2015 ........ H01M 10/0562
(Continued)

OTHER PUBLICATIONS

Aida et al., JP2015207521A English Translation, Nov. 19 (Year: 2015).*

(Continued)

*Primary Examiner* — Matthew T Martin
*Assistant Examiner* — Alexandra J Simmons
(74) *Attorney, Agent, or Firm* — Element IP, PLC

(57) ABSTRACT

[Problem] To provide a method for efficiently producing a sulfide solid electrolyte using a liquid-phase method.
[Solution to Problem] A method for producing a sulfide solid electrolyte not using a pulverizer in reacting raw materials, wherein a raw material that contains lithium sulfide, a phosphorus compound and a halogen compound, and a complexing agent are stirred in a reactor while a fluid that contains the contents in the reactor is discharged outside the reactor through a discharging port arranged in the reactor and the fluid that contains the discharged contents is returned back to the reactor through a returning port arranged in the reactor to thereby make the contents-containing fluid circulate therethrough.

14 Claims, 5 Drawing Sheets

(51) Int. Cl.
*H01M 10/052* (2010.01)
*H01M 10/0525* (2010.01)

(52) U.S. Cl.
CPC ..... *H01M 10/0525* (2013.01); *C01P 2002/54* (2013.01); *C01P 2002/72* (2013.01); *C01P 2002/82* (2013.01); *C01P 2006/40* (2013.01); *H01M 2300/0068* (2013.01)

(56) References Cited

U.S. PATENT DOCUMENTS

2017/0155170 A1* 6/2017 Sato et al. ........ H01M 10/0562
2018/0241077 A1* 8/2018 Takahashi et al. ..... H01M 4/13

FOREIGN PATENT DOCUMENTS

| WO | WO-2014192309 A1 | 12/2014 | |
|---|---|---|---|
| WO | WO 2017159666 A1 * | 9/2017 | ........ H01M 10/0562 |
| WO | WO-2017159667 | 9/2017 | |
| WO | WO-2018054709 A1 | 3/2018 | |

OTHER PUBLICATIONS

Makino, WO 2017159666 A1 English Translation, Sep. 21 (Year: 2017).*

"Li4PS4I: A Lit Superionic Conductor Synthesized by a Solvent-Based Soft Chemistry Approach", Chemistry of Materials, No. 29, 2017, pp. 1830-1835.

* cited by examiner

METHOD FOR PRODUCING SULFIDE SOLID ELECTROLYTE

TECHNICAL FIELD

The present invention relates to a method for producing a sulfide solid electrolyte.

BACKGROUND ART

With rapid spread of information-related instruments, communication instruments, and so on, such as personal computers, video cameras, and mobile phones, in recent years, development of batteries that are utilized as a power source therefor is considered to be important. Heretofore, in batteries to be used for such an application, an electrolytic solution containing a flammable organic solvent has been used. However, development of batteries having a solid electrolyte layer in place of an electrolytic solution is being made in view of the fact that by making the battery fully solid, simplification of a safety unit may be realized without using a flammable organic solvent within the battery, and the battery is excellent in manufacturing costs and productivity.

A production method of a solid electrolyte to be used for a solid electrolyte layer is roughly classified into a solid-phase method and a liquid-phase method. Furthermore, as for the liquid-phase method, there are a homogeneous method in which a solid electrolyte material is completely dissolved in a solvent; and a heterogeneous method in which a solid electrolyte material is not completely dissolved in a solvent but undergoes through a suspension of solid-liquid coexistence. For example, as the solid-phase method, a method in which raw materials, such as lithium sulfide and diphosphorus pentasulfide are subjected to mechanical milling treatment using an apparatus, such as a ball mill and a bead mill and optionally subjected to heat treatment, thereby producing an amorphous or crystalline solid electrolyte is known (see, for example, PTL 1). In accordance with this method, the solid electrolyte is obtained by applying a mechanical stress to the raw materials, such as lithium sulfide, to promote the reaction of the solids with each other.

On the other hand, as for the homogenous method regarding the liquid-phase method, a method in which a solid electrolyte is dissolved in a solvent and redeposited is known (see, for example, PTL 2). In addition, as for the heterogeneous method, a method in which solid electrolyte raw materials, such as lithium sulfide, are allowed to react in a solvent containing a polar aprotic solvent is known (see, for example, PTLs 3 and 4 and NPL 1). For example, PTL 4 discloses that a production method of a solid electrolyte having an $Li_4PS_4I$ structure includes a step in which dimethoxyethane (DME) is used and bound with the $Li_3PS_4$ structure, to obtain $Li_4PS_4 \cdot DME$. The obtained solid electrolyte has an ionic conductivity of $5.5 \times 10^{-5}$ S/cm ($3.9 \times 10^{-4}$ S/cm in the calcium-doped product). PL 5 discloses a solid electrolyte production apparatus including a combination of a pulverizing and synthesizing means of reacting a raw material such as lithium sulfide with pulverizing in a solvent (specifically, a pulverizer) and a synthesizing means of reacting a raw material such as lithium sulfide in a solvent (specifically a reactor equipped with a stirring impeller), as connected, and a production method for a solid electrolyte using the apparatus.

CITATION LIST

Patent Literature

[PTL 1] WO 2017/159667 A
[PTL 2] JP 2014-191899 A
[PTL 3] WO 2014/192309 A
[PTL 4] WO 2018/054709 A
[PTL 5] JP 2015-207521 A

Non-Patent Literature

[NPL 1] "CHEMISTRY OF MATERIALS", 2017, No. 29, pp. 1830-1835

SUMMARY OF INVENTION

Technical Problem

In view of the aforementioned circumstances, the present invention has been made, and an object thereof is to provide a production method for efficiently producing a sulfide solid electrolyte using a liquid-phase method.

Solution to Problem

In order to solve the aforementioned problem, the present inventor made extensive and intensive investigations and, as a result, has found the following matters and has completed the present invention.

1. By stirring not only a raw material for a sulfide solid electrolyte in a reactor but also a complexing agent therein, reaction of the raw material can be promoted without pulverization.
2. At that time, by providing a mechanism of circulating the fluid that contains the contents in the reactor toward the outside of the reactor, the raw material having a large specific gravity such as a lithium halide can be prevented from going down to the bottom of the reactor, especially just below the rotating shaft of the stirring impeller to stay there so as not to participate in the reaction to thereby cause compositional shift of the resultant sulfide solid electrolyte, even though any strong stirring to such a degree that the fluid containing the contents may splash to adhere to the inner wall of the reactor is not given, and therefore the reaction can be efficiently promoted to give a sulfide solid electrolyte having a high ionic conductivity.

Though not clear, the mechanism of preventing the reduction in the reaction efficiency of $Li_2S$ and $P_2S_5$ by preventing the lithium halide having a high specific gravity from precipitating can be considered to be as follows.

In general, lithium sulfide ($Li_2S$) does not form a complex with a complexing agent such as tetramethylethylenediamine (TMEDA) but merely reacts with diphosphorus pentasulfide ($P_2S_5$) existing around it via TMEDA to form $Li_3PS_4$. On the other hand, a lithium halide has a property to readily form a complex with a complexing agent, and therefore when a lithium halide exists around $Li_2S$, the TMEDA concentration in the vicinity of $Li_2S$ can be thereby increased to promote the reaction with $P_2S_5$. On the contrary, when a lithium halide precipitates to lower the concentration in the reaction site, the above-mentioned reaction promoting effect could not be attained so that it is considered that the reaction efficiency of $Li_2S$ and $P_2S_5$ would peak out.

The present inventor has found that the following invention that has been completed by the above-mentioned findings can solve the above-mentioned problem.

[1] A method for producing a sulfide solid electrolyte not using a pulverizer in reacting raw materials, wherein a raw material that contains lithium sulfide, a phosphorus compound and a halogen compound, and a complexing agent are stirred in a reactor while a fluid that contains the contents by the reaction in the reactor is discharged outside the reactor through a discharging port arranged in the reactor and the fluid that contains the discharged contents is returned back to the reactor through a returning port arranged in the reactor to thereby make the contents-containing fluid circulate therethrough.

[2] The method for producing a sulfide solid electrolyte according to the above [1], wherein the raw material contains two or more kinds of solid compounds, and the density difference between the compound having a highest density and the compound having a lowest density is 1.0 g/cm$^3$ or more.

[3] The method for producing a sulfide solid electrolyte according to the above [1], wherein the circulation amount per minute of the contents-containing fluid is 0.01 times or more and 5.0 times or less the volume of the contents-containing fluid in the reactor.

[4] The method for producing a sulfide solid electrolyte according to the above [1], wherein the volume of the reactor is 30 L or more.

[5] The method for producing a sulfide solid electrolyte according to the above [3], wherein the circulation amount per minute of the contents-containing fluid is 3.5 L/min or more and 100 L/min or less.

[6] The method for producing a sulfide solid electrolyte according to the above [1], wherein the contents-containing fluid is not subjected to a pulverizing step.

[7] The method for producing a sulfide solid electrolyte according to the above [1], wherein the discharging port is arranged at the bottom of the reactor.

[8] The method for producing a sulfide solid electrolyte according to the above [1], wherein the returning port is arranged lower than the liquid level of the contents-containing fluid in the reactor.

[9] The method for producing a sulfide solid electrolyte according to the above [1], wherein the temperature in the reactor is controlled.

[10] The method for producing a sulfide solid electrolyte according to the above [1], wherein one or more selected from lithium bromide (LiBr), lithium iodide (LiI) and lithium chloride (LiCl) are used as the halogen element-containing compound.

[11] The method for producing a sulfide solid electrolyte according to the above [1], wherein one or more selected from bromine (Br$_2$) and iodine (I$_2$) are used as the halogen element-containing compound.

[12] The method for producing a sulfide solid electrolyte according to the above [1], wherein the complexing agent contains a nitrogen atom.

[13] The method for producing a sulfide solid electrolyte according to the above [1], wherein the complexing agent has two or more amino groups.

[14] The method for producing a sulfide solid electrolyte according to the above [1], wherein the complexing agent is tetramethylethylenediamine.

Advantageous Effects of Invention

According to the present invention, there can be provided a method for efficiently producing a sulfide solid electrolyte using a liquid-phase method.

DESCRIPTION OF EMBODIMENTS

Figure 1:
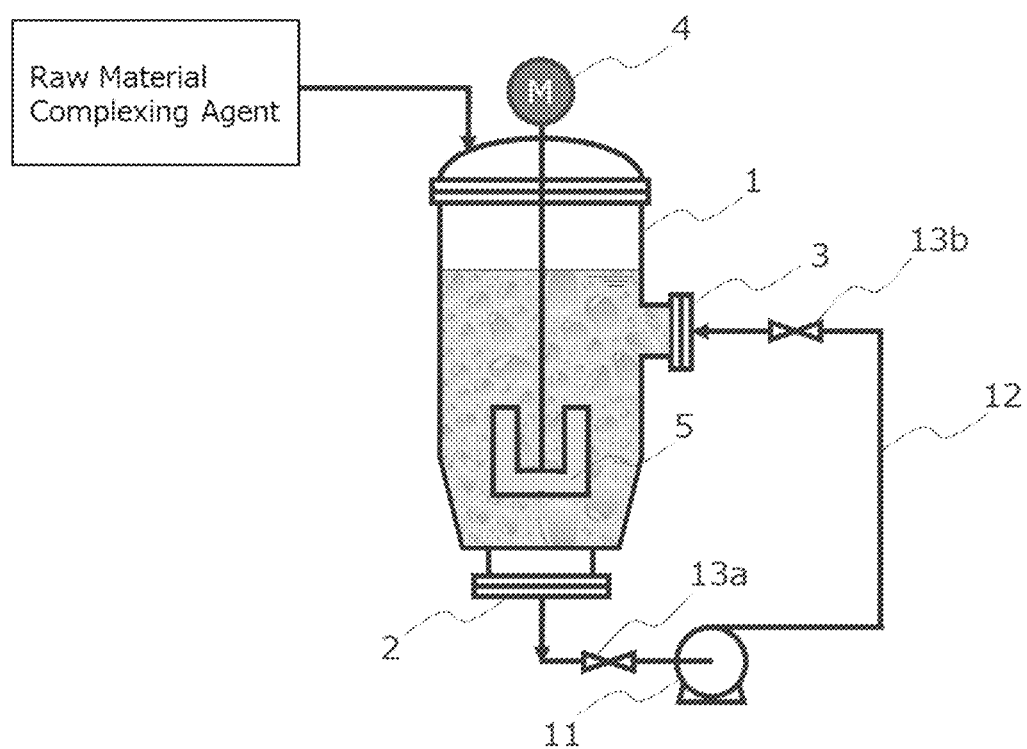
FIG. 1 This is a flow chart of explaining one example of a preferred mode of a reactor-including flow for use in the production method of the present embodiment.

Embodiments of the present invention (hereinafter sometimes referred to as "present embodiment") are hereunder described. In this specification, numerical values of an upper limit and a lower limit according to numerical value ranges of "or more", "or less", and "XX to YY" are each a numerical value which can be arbitrarily combined, and numerical values of the section of Examples can also be used as numerical values of an upper limit and a lower limit, respectively.

(Findings that the Present Inventors have Obtained for Reaching the Present Invention)

The present inventors have made assiduous studies for the purpose of solving the above-mentioned problems and, as a result, have found the following matters and have completed the present invention.

Toward practical use of all-solid-state batteries, for example, increasing in size (for mass-production) for industrial production of a reactor having a size of 30 L or more has become investigated these days, and a liquid-phase method is watched as a method for simple and mass-scale synthesis in addition to versatility and applicability. However, as for the conventional solid-phase method accompanied with mechanical milling treatment or the like, as disclosed in PTL 1, the solid-phase reaction is the center, and the solid electrolyte is readily obtained in a high purity, and thus, a high ionic conductivity can be realized. On the other hand, as for the liquid-phase method, as disclosed in PTLs 2 to 4 and NPL 1, for the reasons that the solid electrolyte is dissolved, and thus, decomposition, breakage, or the like of a part of the solid electrolyte components is generated during deposition, it was difficult to realize a high ionic conductivity as compared with the solid-phase synthesis method.

For example, according to the homogenous method, the raw materials or the solid electrolyte is once completely dissolved, and thus, the components can be homogenously dispersed in the liquid. But, in the subsequent deposition step, the deposition proceeds according to an inherent solubility of each of the components, and thus, it is extremely difficult to perform the deposition while keeping the dispersed state of the components. As a result, each of the components is separated and deposited. In addition, according to the homogenous method, an affinity between the solvent and lithium becomes excessively strong, and therefore, even by drying after deposition, the solvent hardly comes out. For these matters, it has been known that the homogenous method involves such a problem that the ionic conductivity of the solid electrolyte is largely lowered.

In addition, it has also been known that, even in the heterogeneous method of solid-liquid coexistence, a part of the solid electrolyte is dissolved, and thus, separation takes place owing to elution of the specified component, so that it is difficult to obtain a desired solid electrolyte.

Further, in a liquid-phase method of the above-mentioned homogeneous method and the heterogeneous method, mixing is generally attained using an apparatus that enables stirring, such as a stirring machine equipped with a stirring impeller for reaction. The present inventors have found that, by mixing a raw material for a sulfide solid electrolyte and a complexing agent, the reaction of the raw materials can be promoted in a liquid phase even though a mechanical milling treatment is not carried out. However, as a result of upsizing the apparatus in some degree for industrial production, the present inventors have found a phenomenon that the reaction speed of some solid electrolyte raw materials, $Li_2S$ and $P_2S_5$ peaks out by mere ordinary stirring, and the production efficiency greatly lowers. The present inventors have further investigated the phenomenon and, as a result, have surprisingly found that the precipitation of a lithium halide to occur during stirring is one reason for the phenomenon.

However, during the investigation for upsizing (for mass-scaling) toward industrial production, the following has become known. A fluid that contains an electrolyte material and a solvent (hereinafter this may be simply referred to as "fluid") generally has a high viscosity, though depending on the concentration of the solid electrolyte material, and has a property of high adhesiveness, and therefore, when stirring is to be carried out for the purpose of preventing precipitation of a lithium halide, extremely powerful stirring is necessary so that the fluid may splash to adhere to the inner wall of the reactor, and as a result, the composition of the resultant solid electrolyte may be shifted to cause reduction in the ionic conductivity of the solid electrolyte.

Even when powerful stirring is carried out using a stirring impeller or the like, it has also been confirmed that a lithium halide has a high specific gravity and, after all, may go down to the bottom of the reactor, especially just below the rotating shaft of the stirring impeller to stay there.

The above-mentioned problem is one that has become clarified for the first time only in the case of trying mass-production of a sulfide solid electrolyte according to a liquid-phase method, and is a phenomenon that has not been recognized at all previously.

The apparatus disclosed in PTL 5 is based on the premise that the reaction is promoted by pulverizing the raw materials in the reactor for synthesis, and therefore in this, the above-mentioned problem may hardly occur in the reactor but pulverization synthesis is indispensable, that is, there still remains room for improvement in production efficiency with the apparatus.

Based on the above-mentioned findings, the present inventors have reached an invention relating to a production method for efficiently producing a sulfide solid electrolyte according to a liquid-phase method, as described below.

[Production Method for Sulfide Solid Electrolyte]

The production method for a sulfide solid electrolyte of the present embodiment is a production method not using a pulverizer in reacting raw materials, wherein a raw material that contains lithium sulfide, a phosphorus compound and a halogen compound, and a complexing agent are reacted with stirring in a reactor, while a fluid that contains the contents by the reaction in the reactor is discharged outside the reactor through a discharging port arranged in the reactor and the fluid that contains the discharged contents is returned back to the reactor through a returning port arranged in the reactor to thereby make the contents-containing fluid circulate therethrough.

The contents-containing fluid in the reactor contains a lithium element-containing compound (for example, lithium sulfide) as a raw material, and other solids, and since the complexing agent is liquid, the fluid generally contains in the liquid complexing agent, a reaction product of the raw material and the complexing agent, an unreacted raw material, a reaction product thereof, and a reaction product produced by reaction of unreacted raw materials, and may further contain a solvent that may be optionally used, that is, the fluid is a slurry that contains a solid and a liquid. The "reaction product of the raw material and the complexing agent" is a reaction product produced by reacting a raw material and a complexing agent with stirring, and is considered to have a morphology like a complex where the lithium atom, the sulfur atom, the phosphorus atom and the halogen atom contained in the raw material are reacted with the complexing agent to form a bond (coordination bond) of these atoms bonding to each other via the complexing agent and/or directly not via the complexing agent. The "reaction product" differs from raw materials and also differs from "sulfide solid electrolyte", and are to be differentiated from these, which will be described hereinunder. In the present embodiment, via the reaction product of a raw material and a complexing agent, the reaction of raw materials is promoted to enable efficient production of a sulfide solid electrolyte.

By circulating the contents-containing fluid without stirring them with a stirring apparatus such as a stirrer, the amount of the raw material that may precipitate and stay at the bottom of a reactor so as not to contribute to reaction can be reduced, and the composition of the resultant sulfide solid electrolyte can be prevented from being shifted. In addition, the circulation can generate a convection flow of the contents-containing fluid in the reactor, and accordingly even when stirring with a stirring apparatus such as a stirrer equipped with a stirring impeller is to such a degree that the fluid would not splash out, the raw material in the fluid can still secure a uniform dispersion state, and therefore, while preventing compositional shift of the sulfide solid electrolyte owing to splashing, the reaction of the raw material and the complexing agent and further the reaction of the raw materials can be thereby promoted. In that manner, according to a liquid-phase method, a sulfide solid electrolyte having a high ionic conductivity can be produced more efficiently.

The "solid electrolyte" as referred to in this specification means an electrolyte of keeping the solid state at 25° C. in a nitrogen atmosphere. The "sulfide solid electrolyte" obtained according to the production method of the present embodiment is a solid electrolyte containing a lithium element, a sulfur element, a phosphorus element, and a halogen element and having an ionic conductivity to be caused by the lithium element.

In the "sulfide solid electrolyte", both of a crystalline sulfide solid electrolyte having a crystal structure and an amorphous sulfide solid electrolyte, which are obtained by the production method of the present embodiment, are included. The crystalline sulfide solid electrolyte as referred to in this specification is a material that is a solid electrolyte in which peaks derived from the solid electrolyte are observed in an X-ray diffraction pattern in the X-ray diffractometry, and the presence or absence of peaks derived from the raw materials of the solid electrolyte does not matter. That is, the crystalline sulfide solid electrolyte contains a crystal structure derived from the solid electrolyte, in which a part thereof may be a crystal structure derived from the solid electrolyte, or all of them may be a crystal structure derived from the solid electrolyte. The crystalline sulfide solid electrolyte may be one in which an amorphous solid electrolyte is contained in a part thereof so long as it has the X-ray diffraction pattern as mentioned above. In consequence, in the crystalline sulfide solid electrolyte, a so-called glass ceramics which is obtained by heating the amorphous solid electrolyte to a crystallization temperature or higher is contained.

The amorphous sulfide solid electrolyte as referred to in this specification is a halo pattern in which other peak than the peaks derived from the materials is not substantially observed in an X-ray diffraction pattern in the X-ray diffractometry, and it is meant that the presence or absence of peaks derived from the raw materials of the solid electrolyte does not matter.

(Raw Material)

The raw materials used in the present embodiment are two or more selected from compounds containing at least one element of a lithium element, a sulfur element, a phosphorus element and a halogen element, and contain lithium sulfide, a phosphorus compound and a halogen compound. Namely, in the present embodiment, as two or more compounds containing at least one or more elements of a lithium element, a sulfur element, a phosphorus element and a halogen element, those containing lithium sulfide, a phosphorus compound and a halogen compound are used as raw materials. As described previously, for the solid electrolyte in the present embodiment, raw materials containing a lithium element, a sulfur element, a phosphorus element and a halogen element are employed as two or more compounds, and therefore the solid electrolyte contains a lithium element, a sulfur element, a phosphorus element and a halogen element.

The compounds for use as the raw materials contain at least one element of a lithium element, a sulfur element, a phosphorus element and a halogen element, that is, the compounds are lithium sulfide, a phosphorus compound and a halogen compound. More specifically, representative examples of the foregoing compounds include raw materials composed of at least two elements selected from the aforementioned four elements, such as lithium sulfide; lithium halides, e.g., lithium fluoride, lithium chloride, lithium bromide, and lithium iodide (these correspond to a halogen compound); phosphorus sulfides, e.g., diphosphorus trisulfide ($P_2S_3$) and diphosphorus pentasulfide ($P_2S_5$); phosphorus halides, e.g., various phosphorus fluorides (e.g., $PF_3$ and $PF_5$), various phosphorus chlorides (e.g., $PCl_3$, $PCl_5$, and $P_2Cl_4$), various phosphorus bromides (e.g., $PBr_3$ and $PBr_5$), and various phosphorus iodides (e.g., $PI_3$ and $P_2I_4$); and thiophosphoryl halides, e.g., thiophosphoryl fluoride ($PSF_3$), thiophosphoryl chloride ($PSCl_3$), thiophosphoryl bromide ($PSBr_3$), thiophosphoryl iodide ($PSI_3$), thiophosphoryl dichlorofluoride ($PSCl_2F$), and thiophosphoryl dibromofluoride ($PSBr_2F$) (these correspond to a phosphorus compound), as well as halogen simple substances, such as fluorine ($F_2$), chlorine ($Cl_2$), bromine ($Br_2$), and iodine ($I_2$) (these correspond to a halogen compound), with bromine ($Br_2$) and iodine ($I_2$) being preferred.

As materials which may be used as the raw material other than those mentioned above, a compound containing not only at least one element selected from the aforementioned four elements but also other element than the foregoing four elements can be used. More specifically, examples thereof include lithium compounds, such as lithium oxide, lithium hydroxide, and lithium carbonate; alkali metal sulfides, such as sodium sulfide, potassium sulfide, rubidium sulfide, and cesium sulfide; metal sulfides, such as silicon sulfide, germanium sulfide, boron sulfide, gallium sulfide, tin sulfide (e.g., SnS and $SnS_2$), aluminum sulfide, and zinc sulfide; phosphoric acid compounds, such as sodium phosphate and lithium phosphate (these correspond to a phosphorus compound); halide compounds of an alkali metal other than lithium, such as sodium halides, e.g., sodium iodide, sodium fluoride, sodium chloride, and sodium bromide (these correspond to a halogen compound); metal halides, such as an aluminum halide, a silicon halide, a germanium halide, an arsenic halide, a selenium halide, a tin halogen, an antimony halide, a tellurium halide, and a bismuth halide (these correspond to a halogen compound); and phosphorus oxyhalides, such as phosphorus oxychloride ($POCl_3$) and phosphorus oxybromide ($POBr_3$) (these correspond to both a phosphorus compound and a halogen compound).

In the present embodiment, among them, phosphorus sulfides, such as lithium sulfide, diphosphorus trifluoride ($P_2S_3$), and dip hosp horus pentasulfide ($P_2S_5$); halogen simple substances, such as fluorine ($F_2$), chlorine ($Cl_2$), bromine ($Br_2$), and iodine ($I_2$); and lithium halides, such as lithium fluoride, lithium chloride, lithium bromide, and lithium iodide are preferred as the compounds usable as the raw material from the viewpoint of more easily obtaining a sulfide solid electrolyte having a high ionic conductivity. Preferred examples of a combination of compounds usable as raw materials include a combination of lithium sulfide, diphosphorus pentasulfide, and a lithium halide; and a combination of lithium sulfide, diphosphorus pentasulfide, and a halogen simple substance, in which the lithium halide is preferably lithium bromide, lithium iodide or lithium chloride, and the halogen simple substance is preferably bromine or iodine. For the lithium halide and the halogen simple substance, one alone or plural kinds of the examples thereof mentioned above can be used either singly or as combined.

In the present embodiment, the compound usable as the raw material includes a solid electrolyte such as $Li_3PS_4$ that contains a $PS_4$ structure. The production method of the present embodiment uses, as the raw material, a lithium-containing structure such as $Li_3PS_4$ that exists in the solid electrolyte as a main structure to be produced according to the production method, and therefore, as compared with the case of producing a sulfide solid electrolyte using the above-mentioned compound such as lithium sulfide as the raw material to form the electrolyte by reaction of the compounds for synthesis, in the production method of the present embodiment, the component ratio of the structure can be increased and the ionic conductivity can be therefore increased.

By previously preparing a solid electrolyte that contains the above-mentioned structure, and using it as a raw material, the structure and the halogen atom-containing raw material such as a halogen simple substance or a lithium halide can bond (in coordination) to each other via and/or not via a complexing agent to more readily give a reaction product where the halogen atom is dispersed and fixed. As a result, a sulfide solid electrolyte having a high ionic conductivity can be thereby obtained.

The solid electrolyte employable as the compound for the raw material in the present embodiment includes an amorphous sulfide solid electrolyte having an $Li_3PS_4$ structure as a molecular structure (also referred to as "amorphous $Li_3PS_4$"), and a crystalline sulfide solid electrolyte having the structure (also referred to as "crystalline $Li_3PS_4$"). In consideration of improving ionic conductivity, an amorphous sulfide solid electrolyte or a crystalline sulfide solid electrolyte not containing a $Li_4P_2S_7$ structure is preferred. As such a solid electrolyte, ones produced by a conventionally existing production method, such as a mechanical milling method, a slurry method, and a melt quenching method, can be used, and commercially available products can also be used.

An amorphous sulfide solid electrolyte is also preferred. The dispersibility of a halogen atom in the reaction product improves to facilitate formation of a bond between a halogen atom and a lithium atom, a sulfur atom and a phosphorus atom in the solid electrolyte so that the reaction between the raw materials is thereby promoted and, as a result, a sulfide solid electrolyte having a higher ionic conductivity can be produced.

In the case where the above-mentioned solid electrolyte is employed as the compound, the content of the $Li_3PS_4$ structure-having amorphous sulfide solid electrolyte to the total of the raw materials is preferably 60 to 100 mol %, more preferably 65 to 90 mol %, even more preferably 70 to 80 mol %.

In the case where a $Li_3PS_4$ structure-having solid electrolyte and a halogen simple substance are used, the content of the halogen simple substance relative to the $Li_3PS_4$ structure-having amorphous sulfide solid electrolyte is preferably 1 to 50 mol %, more preferably 2 to 40 mol %, even more preferably 3 to 25 mol %, further more preferably 3 to 15 mol %.

In the case where lithium sulfide is used as an alkali metal-containing compound in the present embodiment, the lithium sulfide is preferably a particle.

An average particle diameter ($D_{50}$) of the lithium sulfide particle is preferably 0.1 μm or more and 1000 μm or less, more preferably 0.5 μm or more and 100 μm or less, and still more preferably 1 μm or more and 20 μm or less. In this specification, the average particle diameter ($D_{50}$) is a particle diameter to reach 50% of all the particles in sequential cumulation from the smallest particles in drawing the particle diameter distribution cumulative curve, and the volume distribution is concerned with an average particle diameter which can be, for example, measured with a laser diffraction/scattering particle diameter distribution measuring device. In addition, among the above-exemplified raw materials, the solid raw material is preferably one having an average particle diameter of the same degree as in the aforementioned lithium sulfide particle, namely one having an average particle diameter falling within the same range as in the aforementioned lithium sulfide particle is preferred.

In the case of using lithium sulfide, diphosphorus pentasulfide, and the lithium halide as the raw materials, from the viewpoint of obtaining higher chemical stability and a higher ionic conductivity, a proportion of lithium sulfide relative to the total of lithium sulfide and diphosphorus pentasulfide is preferably 70 to 80 mol %, more preferably 72 to 78 mol %, and still more preferably 74 to 76 mol %.

In the case of using lithium sulfide, diphosphorus pentasulfide, a lithium halide, and other raw material to be optionally used, the content of lithium sulfide and diphosphorus pentasulfide relative to the total of the aforementioned raw materials is preferably 60 to 100 mol %, more preferably 65 to 90 mol %, and still more preferably 70 to 80 mol %.

In the case of using a combination of lithium bromide and lithium iodide as the lithium halide, from the viewpoint of enhancing the ionic conductivity, a proportion of lithium bromide relative to the total of lithium bromide and lithium iodide is preferably 1 to 99 mol %, more preferably 20 to 90 mol %, still more preferably 40 to 80 mol %, and especially preferably 50 to 70 mol %.

In the case of using not only a halogen simple substance but also lithium sulfide and diphosphorus pentasulfide as the raw materials, a proportion of the molar number of lithium sulfide excluding lithium sulfide having the same molar number as the molar number of the halogen simple substance relative to the total molar number of lithium sulfide and diphosphorus pentasulfide excluding lithium sulfide having the same molar number as the molar number of the halogen simple substance falls preferably within a range of 60 to 90%, more preferably within a range of 65 to 85%, still more preferably within a range of 68 to 82%, yet still more preferably within a range of 72 to 78%, and even yet still more preferably within a range of 73 to 77%. This is because when the foregoing proportion falls within the aforementioned ranges, a higher ionic conductivity is obtained. In addition, in the case of using lithium sulfide, diphosphorus pentasulfide, and a halogen simple substance, from the same viewpoint, the content of the halogen simple substance relative to the total amount of lithium sulfide, diphosphorus pentasulfide, and the halogen simple substance is preferably 1 to 50 mol %, more preferably 2 to 40 mol %, still more preferably 3 to 25 mol %, and yet still more preferably 3 to 15 mol %.

In the case of using lithium sulfide, diphosphorus pentasulfide, a halogen simple substance, and a lithium halide, the content (α mol %) of the halogen simple substance and the content (β mol %) of the lithium halide relative to the total of the aforementioned raw materials preferably satisfy the following expression (2), more preferably satisfy the following expression (3), still more preferably satisfy the following expression (4), and yet still more preferably satisfy the following expression (5).

$$2 \leq (2\alpha+\beta) \leq 100 \quad (2)$$

$$4 \leq (2\alpha+\beta) \leq 80 \quad (3)$$

$$6 \leq (2\alpha+\beta) \leq 50 \quad (4)$$

$$6 \leq (2\alpha+\beta) \leq 30 \quad (5)$$

In the case of using two halogen simple substances, when the molar number in the substance of the halogen element of one side is designated as A1, and the molar number in the substance of the halogen element of the other side is designated as A2, an A1/A2 ratio is preferably (1 to 99)/(99 to 1), more preferably 10/90 to 90/10, still more preferably 20/80 to 80/20, and yet still more preferably 30/70 to 70/30.

In the case where the two halogen simple substances are bromine and iodine, when the molar number of bromine is designated as B1, and the molar number of iodine is designated as B2, a B1/B2 ratio is preferably (1 to 99)/(99 to 1), more preferably 15/85 to 90/10, still more preferably 20/80 to 80/20, yet still more preferably 30/70 to 75/25, and especially preferably 35/65 to 75/25.

In the case where two or more kinds of solid compounds are used as raw materials, regarding the density of the compounds in the contents-containing fluid in a reactor, the density difference between the compound having a highest density and the compound having a lowest density is, from the viewpoint of easiness in production, preferably 1.0 g/cm³ or more, more preferably 1.5 g/cm³ or more, even more preferably 1.8 g/cm³ or more, further more preferably 2.0 g/cm³ or more. Also from the same viewpoint, the upper limit is preferably 3.5 g/cm³ or less, more preferably 3.0 g/cm³ or less, even more preferably 2.8 g/cm³ or less, further more preferably 2.6 g/cm³ or less. In the production method of the present embodiment, the contents-containing fluid can be circulated even when raw materials having such a density difference are used, and therefore, a raw material having a large specific gravity such as a lithium halide can be prevented from precipitating and staying at the bottom of a reactor.

(Complexing Agent)

In the production method of a sulfide solid electrolyte of the present embodiment, a complexing agent is used. The complexing agent as referred to in this specification is a substance capable of reacting with a raw material to form a reaction product, more specifically, a substance capable of forming a complex with a lithium atom, and means one having such properties of acting with the lithium element-containing sulfide and the halide contained in the aforementioned raw materials, thereby promoting formation of the reaction product.

Not specifically limited, the complexing agent may be any one having the above-mentioned properties, and is, in particular, preferably a compound containing an atom having a high affinity to a lithium atom, for example, a hetero atom such as a nitrogen atom, an oxygen atom and a chlorine atom, more preferably a compound having a group that contains these hetero atoms. Among these hetero atoms, a nitrogen atom is preferred. This is because, these hetero atoms and the group containing the hetero atom can coordinate (bond) with lithium.

The complexing agent is considered to have a property such that, the hetero atom in the molecule thereof has a high affinity to a lithium atom, and can bond to a lithium-containing structure such as $Li_3PS_4$ that contains a $PS_4$ structure typically existing as a main structure in the sulfide solid electrolyte to be obtained in the production method of the present embodiment, or to a lithium-containing raw material such as a lithium halide, thereby to readily form an aggregate. Consequently, by mixing the raw material and the complexing agent, a reaction product with a halogen atom more effectively dispersed and fixed therein can be obtained, in which an aggregate formed via a lithium-containing structure such as a $PS_4$ structure or a complexing agent, or an aggregate formed via a lithium-containing raw material such as a lithium halide or a complexing agent can exist evenly, and as a result, it is considered that a sulfide solid electrolyte having a high ionic conductivity can be obtained. It is also considered that a side effect of suppressing generation of hydrogen sulfide can be attained.

Consequently, the complexing agent for use in the present embodiment preferably has at least two hetero atoms capable of forming a coordinate (bond) in the molecule, and more preferably has a group containing at least two such hetero atoms in the molecule. Since the complexing agent has a group that contains at least two hetero atoms in the molecule, a lithium-containing structure such as $Li_3PS_4$ that contains a $PS_4$ structure, and a lithium-containing compound such as a lithium halide can be bonded via the at least two hero atoms in the molecule. Owing to the bonding, the halogen atom can be more effectively dispersed and fixed in the reaction product, and as a result, a solid electrolyte having a high ionic conductivity can be obtained.

As described previously, a nitrogen atom is preferred among the hetero atoms, and an amino group is preferred as a nitrogen atom-containing group. That is, an amine compound is preferred as the complexing agent.

Examples of such an amine compound include an amine compound such as an aliphatic amine, an alicyclic amine, a heterocyclic amine, and an aromatic amine, and these can be used singly or as a mixture of two or more kinds thereof as combined. Above all, an aliphatic amine is preferred from the viewpoint of easiness in expressing the function of the complexing agent.

Typical preferred examples of the aliphatic amine include aliphatic diamines, such as an aliphatic primary diamine such as ethylenediamine, diaminopropane, and diaminobutane; an aliphatic secondary diamine such as N, N'-dimethylethylenediamine, N, N'-diethylethylenediamine, N, N'-dimethyldiaminopropane, and N, N'-diethyldiaminopropane; an aliphatic tertiary diamine such as N,N,N',N'-tetramethyldiaminomethane, N, N, N',N'-tetramethylethylenediamine, N, N, N',N'-tetraethylethylenediamine, N, N, N',N'-tetramethyldiaminopropane, N, N,N',N'-tetraethyldiaminopropane, N, N, N',N'-tetramethyldiaminobutane, N, N, N',N'-tetramethyldiaminopentane, and N,N,N',N'-tetramethyldiaminohexane. Regarding exemplification as referred to in this specification, for example, a diaminobutane includes not only isomers relative to the position of the amino group, such as 1,2-diaminobutane, 1,3-diaminobutane and 1,4-diaminobutane, but also other all isomers such as linear or branched isomers relative to butane, unless otherwise specifically imidated.

The carbon number of the aliphatic amine is preferably 2 or more, more preferably 4 or more, even more preferably 6 or more, and the upper limit is preferably 10 or less, more preferably 8 or less, even more preferably 7 or less. The carbon number of the aliphatic hydrocarbon group in the aliphatic amine is preferably 2 or more, and the upper limit is preferably 6 or less, more preferably 4 or less, even more preferably 3 or less.

Typically, preferred examples of the alicyclic amine include alicyclic diamines, such as an alicyclic primary diamine such as cyclopropanediamine, and cyclohexanediamine; an alicyclic secondary diamine such as bisaminomethylcyclohexane; an alicyclic tertiary diamine such as N, N, N',N'-tetramethyl-cyclohexanediamine, and bis(ethylmethylamino)cyclohexane, and preferred examples of the heterocyclic amine include heterocyclic diamines, such as a heterocyclic primary diamine such as isophorone diamine; a heterocyclic secondary diamine such as piperazine, and dipiperidylpropane; and a heterocyclic tertiary diamine such as N, N-dimethylpiperazine, and bismethylpiperidylpropane.

The carbon number of the alicyclic amine and the heterocyclic amine is preferably 3 or more, more preferably 4 or more, and the upper limit is preferably 16 or less, more preferably 14 or less.

Typically, preferred examples of the aromatic amine include aromatic diamines, such as an aromatic primary diamine such as phenyldiamine, tolylenediamine, and naphthalenediamine; an aromatic secondary diamine such as N-methylphenylenediamine, N, N'-dimethylphenylenediamine, N, N'-bismethylphenylphenylenediamine, N, N'-dimethylnaphthalenediamine, and N-naphthylethylenediamine; and an aromatic tertiary diamine such as N, N-dimethylphenylenediamine, N, N, N',N'-tetramethylphenylenediamine, N, N, N',N'-tetramethyldiaminodiphenylmethane, and N, N, N',N'-tetramethylnaphthalenediamine.

The carbon number of the aromatic amine is preferably 6 or more, more preferably 7 or more, even more preferably 8 or more, and the upper limit is preferably 16 or less, more preferably 14 or less, even more preferably 12 or less.

The amino compound for use in the present embodiment may be substituted with a substituent such as an alkyl group, an alkenyl group, an alkoxy group, a hydroxy group, or a cyano group, or with a halogen atom.

As specific examples, diamines are exemplified herein, but needless to say, the amine compound for use in the production method in the present embodiment is not limited to a diamine, and, for example, aliphatic monoamines corresponding to various diamines such as the above-mentioned aliphatic diamines of trimethylamine, triethylamine and ethyldimethylamine; as well as piperidine compounds such as piperidine, methylpiperidine, and tetramethylpiperidine, pyridine compounds such as pyridine, and picoline, morpholine compounds such as morpholine, methylmorpholine, and thiomorpholine, imidazole compounds such as imidazole, and methylimidazole, and also aliphatic monoamines that are monoamines corresponding to the above-mentioned alicyclic diamines, or other monoamines such as heterocyclic monoamines corresponding to the heterocyclic diamines, and aromatic monoamines corresponding to the aromatic diamines, and in addition thereto, polyamines having 3 or more amino groups, such as diethylenetriamine, N, N',N''-trimethyldiethylenetriamine, N, N, N',N'', N''-pentamethyldiethylenetriamine, triethylenetetramine, N, N'-bis[(dimethylamino)ethyl]-N, N'-dimethylethylenediamine, hexamethylenetetramine, and tetraethylenepentamine, are also usable.

Among those described above, from the viewpoint of obtaining a higher ionic conductivity, amine compounds having two or more amino groups are preferred, and diamines having two amino groups are more preferred.

Also from the same viewpoint as above, tertiary diamines having two tertiary amino groups are more preferred, tertiary diamines having two tertiary amino groups on both ends are still more preferred, and aliphatic tertiary diamines having a tertiary amino group on both ends are yet still more preferred. In the aforementioned amine compounds, as the aliphatic tertiary diamine having a tertiary amino group on both ends, tetramethylethylenediamine, tetraethylethylenediamine, tetramethyldiaminopropane, and tetraethyldiaminopropane are preferred, and in consideration of easy availability, tetramethylethylenediamine and tetramethyldiaminopropane are preferred, and tetramethylethylenediamine is especially preferred.

As the other complexing agent than the above-mentioned amine compound, a compound having a group that contains a hetero atom such as an oxygen atom, or a halogen atom, e.g., a chlorine atom has a high affinity to a lithium atom, and therefore can be used as the other complexing agent than the amine compound. A compound having a group that contains a nitrogen atom as a hetero atom, except an amino group, for example, having a nitro group or an amide group, can also have the same effect. However, in the production method of the present embodiment, when the other complexing agent than the amine compound is used singly, this functions as a complexing agent, but when this is used as combined with an amine compound, the amine compound dominantly functions as the already-mentioned complexing agent, and therefore in this case, the other compound than the amine compound could not substantially function as a complexing agent but can function as a solvent as will be mentioned hereinunder.

Examples of the other complexing agent include alcohol solvents, such as ethanol and butanol; ester solvents, such as ethyl acetate and butyl acetate; aldehyde solvents, such as formaldehyde, acetaldehyde, and dimethylformamide; ketone solvents, such as acetone and methyl ethyl ketone; ether solvents, such as diethyl ether, diisopropyl ether, dibutyl ether, tetrahydrofuran, dimethoxyethane, cyclopentyl methyl ether, tert-butyl methyl ether, and anisole; halogen atom-containing aromatic hydrocarbon solvents, such as trifluoromethylbenzene, nitrobenzene, chlorobenzene, chlorotoluene, and bromobenzene; and solvents containing a carbon atom and a hetero atom, such as acetonitrile, dimethyl sulfoxide, and carbon disulfide. Of these, ether solvents are preferred; diethyl ether, diisopropyl ether, dibutyl ether, and tetrahydrofuran are more preferred; and diethyl ether, diisopropyl ether, and dibutyl ether are still more preferred.

In the present embodiment, it is preferred that the content of the amine compound in the complexing agent is high as far as possible. Specifically, the foregoing content is preferably 60% by mass or more, more preferably 80% by mass or more, still more preferably 90% by mass or more, yet still more preferably 95% by mass or more, and especially preferably 100% by mass. That is, it is especially preferred that the whole of the complexing agent is the amine compound.

(Solvent)

In the present embodiment, the contents-containing fluid generally has a high viscosity as described above, and therefore a solvent can be used for lowering the viscosity of the fluid to facilitate stirring. When the raw material and the complexing agent are stirred with a solvent, the viscosity of the resultant system can be lowered to facilitate stirring, and as a result, the effect of using the complexing agent, that is, the effect of promoting formation of a reaction product to be produced by reaction of a lithium atom, a sulfur atom, a phosphorus atom and a halogen atom can be promoted, and an aggregate formed via a lithium-containing structure such as a $PS_4$ structure or the complexing agent, or an aggregate formed via a lithium-containing raw material such as a lithium halide or the complexing agent can be made to exist evenly in the reaction product, and as a result, it is considered that a reaction product in which a halogen atom is more uniformly dispersed and fixed can be obtained, and as a result, the effect of securing a high ionic conductivity can be readily exhibited.

The production method of the present embodiment uses a fluid in the form of a slurry, and is therefore a heterogeneous method, in which it is preferable that the reaction product does not completely dissolve in the complexing agent that is liquid but precipitates out. Using a solvent along with the complexing agent, the solubility of the reaction product can also be controlled. In particular, a halogen atom readily dissolves out of a reaction product, and therefore, by adding a solvent, the halogen atom can be suppressed from dissolving out to give a desired reaction product with ease. As a result, via a reaction product where a halogen and other components are dispersed, a crystalline sulfide solid electrolyte having a high ionic conductivity can be obtained.

More specifically, as the solvent to be used in combination of the above-mentioned complexing agent, any and every solvent heretofore generally used in production of solid electrolytes can be widely used, and examples thereof include a hydrocarbon solvent such as an aliphatic hydrocarbon solvent, an alicyclic hydrocarbon solvent and an aromatic hydrocarbon solvent; and a solvent containing a carbon atom, such as an alcohol solvent, an ester solvent, an aldehyde solvent, a ketone solvent, an ether solvent, and a solvent containing a carbon atom and a hetero atom. Solvents selected from those exemplified as the complexing agent are also employable.

More specifically, examples of the solvent include an aliphatic hydrocarbon solvent, such as hexane, pentane, 2-ethylhexane, heptane, octane, decane, undecane, dodecane, and tridecane; an alicyclic hydrocarbon solvent, such as cyclohexane and methylcyclohexane; an aromatic hydrocarbon solvent, such as benzene, toluene, xylene, mesitylene, ethylbenzene, tert-butylbenzene, trifluoromethylbenzene, nitrobenzene, chlorobenzene, chlorotoluene, and bromobenzene; an alcohol solvent, such as ethanol and butanol; an ester solvent, such as ethyl acetate and butyl acetate; an aldehyde solvent, such as formaldehyde, acetaldehyde, and dimethylformamide; a ketone solvent, such as acetone and methyl ethyl ketone; an ether solvent, such as diethyl ether, diisopropyl ether, dibutyl ether, tetrahydrofuran, dimethoxyethane, cycloheptylmethyl ether, tert-butylmethyl ether, and anisole; and a solvent containing a carbon atom and a hetero atom, such as acetonitrile, dimethyl sulfoxide, and carbon disulfide.

Of these solvents, an aliphatic hydrocarbon solvent, an alicyclic hydrocarbon solvent, an aromatic hydrocarbon solvent, and an ether solvent are preferred; from the viewpoint of obtaining a higher ionic conductivity more stably, an aliphatic hydrocarbon solvent, an alicyclic hydrocarbon solvent, and an ether solvent are more preferred, an alicyclic hydrocarbon solvent and an ether solvent are even more preferred, and an alicyclic hydrocarbon solvent is further more preferred. More specifically, heptane, cyclohexane, toluene, ethylbenzene, diethyl ether, diisopropyl ether, dibutyl ether, dimethoxyethane, cyclopentylmethyl ether, tert-butylmethyl ether, and anisole are preferred; heptane, cyclohexane, diethyl ether, diisopropyl ether, and dibutyl ether are more preferred; cyclohexane, diisopropyl ether and dibutyl ether are even more preferred; and cyclohexane is especially preferred. In the present embodiment, these solvents may be used alone or in combination of plural kinds thereof.

A part of these solvents, for example, an ether solvent having a hetero atom can also be used as a complexing agent to be mentioned hereinunder. As described above, in the case where an amine compound is used as a complexing agent, the amine compound can dominantly function as the previously-mentioned complexing agent, and therefore the ether solvent could not substantially function as a complexing agent but can function as a solvent. The ether solvent described here as a solvent can function as a solvent in the case where an amine compound is used as a complexing gent, but in the case where an amine compound is not used, this can function as a complexing agent. Consequently, the ether solvent is exemplified here also as a solvent.

Accordingly, in the case where an amine compound and an ether solvent are used as combined, the amine compound can be a complexing agent and the ether solvent can be the other solvent, and not limited to the case of an ether solvent, the same shall apply to the solvents exemplified here as a complexing agent and a solvent.

In the case where a solvent is used, the amount of the complexing agent relative to the total amount of the complexing agent and the solvent is preferably 1.5% by mass or more, more preferably 3.0% by mass or more, even more preferably 5.0% by mass or more, and the upper limit is preferably 65.0% by mass or less, more preferably 50.0% by mass or less, even more preferably 35.0% by mass or less, further more preferably 25.0% by mass or less.

(Stirring)

Since the raw material contains a solid and since the complexing agent is liquid, the raw material and the complexing agents are stirred generally in a form of a slurry where a solid raw material exists in a liquid complexing agent. By stirring the raw material and the complexing agent, the raw material and the complexing agent are reacted to give a reaction product. Here, "reaction product" is, as described below, one produced by reacting a complexing agent with a lithium atom, a sulfur atom, a phosphorus atom and a halogen atom, in which these atoms bond (in coordination) to each other via the complexing agent and/or directly not via the complexing agent, and this includes not only the reaction product of the raw material and the complexing agent but also the reaction product of raw materials.

The amount of the raw material to be used relative to one L of the complexing agent could not be indiscriminately defined as varying depending on the volume of the fluid in the reactor, but is, in general, preferably 5 g or more, more preferably 30 g or more, even more preferably 50 g or more, further more preferably 100 g or more, further more preferably 250 g or more, and the upper limit is preferably 800 g or less, more preferably 700 g or less, even more preferably 600 g or less, further more preferably 500 g or less. When the content of the raw material falls within the above range, the raw material can be readily stirred and the dispersion state of the raw material is bettered so that the reaction between the raw material and the complexing agent is thereby promoted, and a reaction product and a sulfide solid electrolyte can be more readily produced.

In the production method of the present invention, for example, where the raw material is reacted by stirring the raw material and the complexing agent, a pulverizer is not used. In the production method of the present embodiment, the reaction of the starting material occurs mainly by stirring the raw material and the complexing agent in the reactor, and not limited in the reactor, a pulverizer is not used in reaction of the raw material. Accordingly, a pulverizer is not used in stirring the raw material and the complexing agent in a reactor, and not limited in a reactor, a pulverizer is not used even in the case of reacting the starting material outside the reactor.

The raw material and the complexing agent are stirred not using a pulverizer as mentioned above, and the mode of stirring is not specifically limited except this point. The raw material inclusion and the complexing agent may be charged in an apparatus capable of mixing the raw material and the complexing agent and mixed therein. For example, by feeding the complexing agent into a reactor, actuating an impeller, and then gradually adding two or more compounds as the raw material, dispersibility of the raw material is enhanced, and thus, such is preferred.

In the case of using a halogen simple substance as the raw material, there is a case where the raw material is not a solid. Specifically, fluorine and chlorine are gaseous, and bromine is liquid at room temperature and under normal pressure. For example, in the case where the raw material is liquid, it may be fed into a reactor separately from the other solid raw material together with a complexing agent, and in the case where the raw material is gaseous, the raw material may be fed such that it is blown into a complexing agent having a solid raw material added thereto.

The production method of the present embodiment is characterized by mixing a raw material and a complexing agent, in which an apparatus to be used for pulverizing a solid raw material, which is generally called "a pulverizer", such as a medium-assisted pulverizer, such as a ball mill and bead mill, is not used. When "a pulverizer" is used in stirring a raw material and a complexing agent, the cost of the pulverizer is high especially in the case of attaining large-scale production (mass-scale production) and therefore, owing to the increase in the initial investment amount, the cost of a sulfide solid electrolyte increases, and there may occur an inconvenience that the sulfide solid electrolyte could not be efficiently supplied.

"Stirring not using a pulverizer" literally means no use of "a pulverizer". "Stirring" in the production method of the present embodiment substantially generates "mixing" accompanied by "stirring", but can be said to mean stirring to such a degree that a solid such as a lithium element-containing compound (e.g., lithium sulfide) used as a raw material is not "pulverized". In the present specification, "a pulverizer" includes pulverizers exemplified as a pulverizer usable for pulverizing the reaction product and the electrolyte precursor to be mentioned below. In the production method of the present embodiment, a pulverizer is not used in stirring a raw material and a complexing agent, and a pulverizer can be used in any other treatment than the stirring of that case.

In the production method for a sulfide solid electrolyte of the present embodiment, merely by mixing a raw material and a complexing agent not using "a pulverizer", the raw material and the complexing agent can react to form a reaction product. Accordingly, as compared with that a case of carrying out pulverization, a sulfide solid electrolyte can be produced more efficiently. Consequently, in the production method of the present embodiment, the contents-containing fluid in the reactor need not be subjected to a pulverizing step. The fact that a reaction product can be produced easily with omitting a pulverizing step as herein can be said to be one characteristic feature of the production method of the present embodiment. In the production method of the present embodiment, in reacting a raw material and a complexing agent, and in circulating the contents-containing fluid in the reactor, preferably, pulverization is not carried out, but for powdering a reaction product, the reaction product can be pulverized with a pulverizer.

Examples of an apparatus for mixing a raw material and a complexing agent include a mechanical agitation type mixer having an impeller provided in a reactor for stirring (this may also be referred to as mixing by stirring, that is, stirring with mixing). Examples of the mechanical agitation type mixer include a high-speed agitation type mixer and a double arm type mixer, and a high-speed agitation type mixer is preferably used from the viewpoint of making the dispersion state of a raw material more uniform by convection flow of the fluid to further promote the reaction of a raw material and a complexing agent and to attain a higher ionic conductivity. Examples of the high-speed agitation type mixer include a vertical axis rotating type mixer and a lateral axis rotating type mixer, and mixers of any of these types may be used.

When a raw material and a complexing agent are stirred with such a mixer, the raw material and the complexing agent may also be "pulverized", but this treatment is substantially for "mixing" and is therefore free from the inconvenience in using "a pulverizer" as mentioned above. On the other hand, however, when "a pulverizer" is used, "mixing" may occur, but the treatment is mainly for "pulverization" and is therefore accompanied by the above-mentioned inconvenience.

Examples of a shape of the impeller which is used in the mechanical agitation type mixer include a blade type, an arm type, an anchor type, a paddle type, a full-zone type, a ribbon type, a multistage blade type, a double arm type, a shovel type, a twin-shaft blade type, a flat blade type, and a C type blade type. From the viewpoint of increasing the homogeneity of the dispersion state of raw materials in a fluid and attaining a higher ionic conductivity, a shovel type, a flat blade type, a C type blade type, an anchor type, a paddle type, and a full-zone type are preferred, and an anchor type, a paddle type and a full-zone type are more preferred.

In the case of using a mechanical agitation type mixer, the rotation number of the impeller is not specifically limited and may be appropriately controlled depending on the volume of the fluid in the reactor, the temperature, and the shape of the impeller. Generally, it may be approximately 5 rpm or more and 400 rpm or less, and is, from the viewpoint of preventing compositional shift owing to fluid splashing and making the dispersion state of the raw material more uniform by convection flow to promote the reaction of a raw material and a complexing agent, the rotation number is preferably 10 rpm or more and 300 rpm or less, more preferably 15 rpm or more and 250 rpm or less, even more preferably 20 rpm or more and 200 rpm or less.

In the production method of the present embodiment, preferably, temperature control in the reactor is attained, that is, temperature control is preferably attained in stirring a raw material and a complexing agent. By temperature control, the reaction between a raw material and a complexing agent is promoted and a sulfide solid electrolyte having a high ionic conductivity can be produced more efficiently.

A temperature condition on the occasion of mixing a raw material and a complexing agent is not particularly limited, and for example, it is generally −30 to 120° C., preferably −10 to 100° C., more preferably 0 to 80° C., even more preferably 10 to 60° C. A mixing time is generally about 0.1 to 500 hours, and is, from the viewpoint of bettering the dispersion condition of a raw material and promoting the reaction of a raw material and a complexing agent, preferably 1 to 450 hours, more preferably 10 to 425 hours, even more preferably 20 to 400 hours, further more preferably 40 to 375 hours.

By mixing a raw material and a complexing agent, it is considered that, owing to an action of the lithium atom, the sulfur atom, the phosphorus atom, and the halogen atom, all of which are contained in the raw materials, with the complexing agent, a reaction product in which these atoms bond to each other via and/or directly not via the complexing agent is obtained. That is, in the production method of the present embodiment, the reaction product of a raw material and a complexing agent that is obtained by mixing the raw material and the complexing agent is constituted of the complexing agent, the lithium atom, the sulfur atom, the phosphorus atom, and the halogen atom. In the present embodiment, the resultant reaction product is not one completely dissolved in the complexing agent that is a liquid, and the contents-containing fluid is generally slurry since the reaction product is solid. The contents-containing fluid can contain, in addition to the reaction product, an unreacted raw material, a complexing agent not participating in the reaction product, and optionally a solvent.

Accordingly, the production method of the present embodiment using a slurry means that the method corresponds to a heterogeneous system in a so-called liquid-phase method.

In the production method of the present embodiment, the raw material and the solvent may be previously stirred to be a slurry before mixing the raw material and the complexing agent. By previously dispersing the raw material in the solvent as a slurry, good contact between the raw material and the complexing agent can be attained just after the start of stirring, and therefore the reaction with stirring of the raw material and the complexing agent can be thereby promoted.

In that case, the amount of the solvent to be used is preferably 0.1 L or more relative to 100 g of the raw material, more preferably 0.3 L or more, even more preferably 0.5 L or more, further more preferably 0.75 L or more, and the upper limit is preferably 5.0 L or less, more preferably 4.0 L or less, even more preferably 3.0 L or less, further more preferably 2.5 L or less.

(Circulation)

In the production method of the present embodiment, is it necessary that the contents-containing fluid is discharged outside the reactor through a discharging port arranged in the reactor and this is returned back to the reactor through a returning port arranged in the reactor to thereby make the contents-containing fluid circulate therethrough. By the circulation, as mentioned above, the reaction product in the fluid can be prevented from precipitating and staying at the bottom of the reactor, the amount of the raw material not contributing toward reaction can be reduced, and a convection flow of the contents-containing fluid in the reactor is generated, whereby even when the stirring of the fluid is to such a degree that the fluid may not splash out, a uniform dispersion state of the raw material in the fluid can be secured, and therefore while the composition of the resultant sulfide solid electrolyte can be prevented from being shifted, the reaction can be promoted and, according to a liquid-phase method, a sulfide solid electrolyte having a high ionic conductivity can be produced more efficiently.

Hereinunder a fluid circulation mode including a discharging port and a returning port arranged in a reactor is described with reference to FIG. 1 showing a flow chart of one example of a preferred mode of a reactor-including flow for use in the production method of the present embodiment.

In the flow of FIG. 1, a reactor 1 having a discharging port 2 and a returning port 3 arranged therein is provided with a stirrer 4 having a stirring impeller 5, and a contents-containing fluid discharged out from the discharging port 2 is returned to the returning port 3 by a pump 11 through a circulation line 12. Valves 13a and 13b are arranged on the suction side and the ejection side of the pump 11, respectively.

Not specifically limited, the reactor may have any configuration that is provided with a discharging port and a returning port and with a stirrer for stirring the fluid in the reactor. For example, the material to constitute the reactor may be appropriately selected from metal, glass or resin, and may be appropriately selected in accordance with the volume of the reactor, the necessary pressure resistance and heat resistance. For example, when the volume is up 10 L or so, a glass-made Schlenk flask or separable flask may be employed, and when the volume is more than 10 L, a metal reactor provided with a discharging port and a returning port may be employed.

The volume of the reactor may be appropriately selected depending on the amount of the desired sulfide solid electrolyte, and is not specifically limited. Generally, the volume may be approximately 0.1 L or more and 100 L or less, preferably 0.3 L or more and 50 L or less. For large-scale production (mass-production) for industrial use, preferably, the volume is 30 L or more, more preferably 100 L or more, even more preferably 500 L or more, further more preferably 600 L or more, and the upper limit is not specifically limited so far as it enables industrial production. For example, the upper limit may fall within a range of 100 kL or less, 50 kL or less, or 10 kL or less.

The discharging port to be arranged in the reactor may be arranged in a position from which the contents-containing fluid in the reactor can be discharged out, that is, it may be arranged lower than liquid level of the fluid, and in consideration of the fact that the unreacted raw material and the reaction product in the fluid have a high specific gravity and may readily precipitate and stay at the bottom of the reactor, especially just below the rotating shaft of the stirring impeller, the discharging port is preferably arranged in the lower part of the reactor, more preferably lower than the stirring impeller, even more preferably at the bottom (lowermost site) of the reactor. FIG. 1 shows an embodiment where the discharging port 2 is arranged at the bottom of the reactor 1.

The returning port to be arranged in the reactor may be arranged in any position with no specific limitation, and it may be arranged on any of the upper side or the lower side of liquid level of the fluid in the reactor. In the case where the returning port is arranged on the upper side of the liquid level of the fluid, from the viewpoint of suppressing the fluid from splashing out, the returning port is preferably arranged through the side wall of the reactor for the purpose of returning the fluid to the reactor along the inner wall surface of the reactor.

Figure 2:
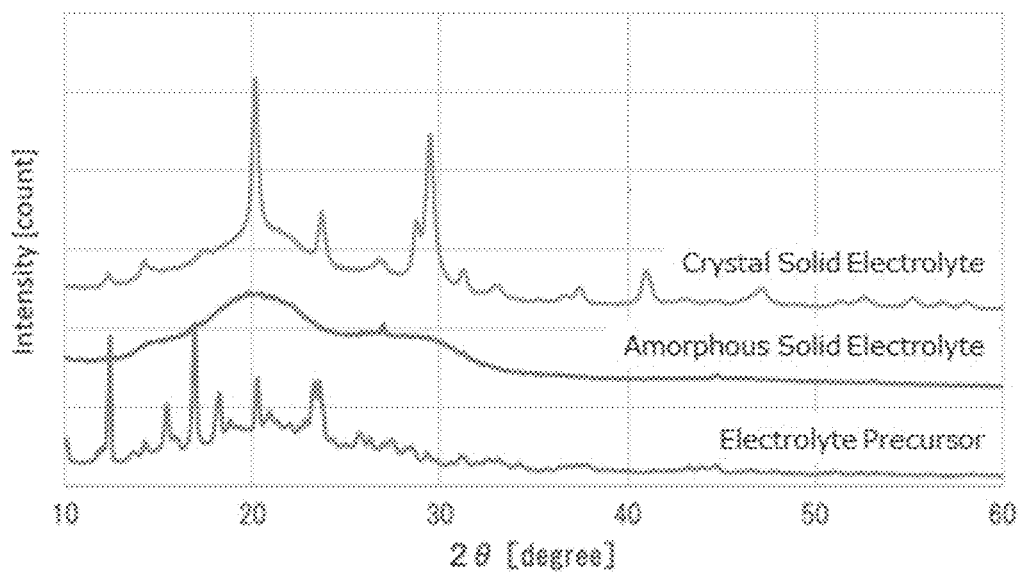
FIG. 2 This shows X-ray diffraction spectra of a reaction product (electrolyte precursor), an amorphous sulfide solid electrolyte and a crystalline sulfide solid electrolyte obtained in Example 3.

From the viewpoint of efficiently generating a convection flow of the fluid in the reactor to thereby prevent the fluid from splashing out and from adhering to the inner wall surface of the reactor, preferably, the returning port is arranged lower than the liquid level of the fluid, more preferably lower than the liquid level of the fluid and upper than the position through which the discharging port is arranged. FIG. 2 shows an embodiment where the returning port 3 is arranged lower than the liquid level of the fluid in the reactor 1 and upper than the discharging port 2.

The returning port is arranged at the side wall as shown in FIG. 1, so far as it is not arranged at the top of the reactor. An inner tube may be further arranged in the returning port so that the fluid having been discharged outside the reactor could be returned to the fluid in the reactor.

The circulation amount per minute of the fluid is not indiscriminately defined, as varying depending on the volume of the fluid in the reactor, and is, from the viewpoint of efficiently generating a convection flow of the fluid in the reactor to thereby prevent the fluid from splashing out and from adhering to the inner wall surface of the reactor, preferably 0.01 times or more the volume of the fluid in the reactor, more preferably 0.03 times or more, even more preferably 0.05 times or more, and the upper limit is preferably 5.0 times or less, more preferably 3.0 times or less, even more preferably 2.0 times or less.

For example, in the case where the volume of the fluid in the reactor is from a laboratory level of more than 1.0 L to a small to medium-scale industrial production level, the circulation amount per minute of the fluid is preferably 0.01 times or more the volume of the fluid in the reactor, more preferably 0.03 times or more, even more preferably 0.05 times or more, and the upper limit may be, though not specifically limited thereto, generally 5.0 times or less. Also for example, in the case where the volume of the fluid in the reactor is on a laboratory level of less than 1.0 L, the circulation amount per minute of the fluid is preferably 0.1 times or more the volume of the fluid in the reactor, more preferably 0.5 times or more, even more preferably 0.75 times or more, further more preferably 1.0 time or more, and the upper limit may be, though not specifically limited thereto, generally 5.0 times or less.

In the case where the volume of the fluid in the reactor is, for example, 30 L or more for large-scale production (mass-production) toward industrial-scale production, the circulation amount per minute of the fluid is preferably 0.01 times or more the volume of the fluid in the reactor, more preferably 0.02 times or more, and the upper limit may be, though not specifically limited thereto, generally 5.0 times or less.

Regarding the circulation amount per minute of the fluid in the case, the absolute amount thereof could not be indiscriminately defined as varying depending on the volume of the fluid, but is preferably 3.5 L/min or more, more preferably 5.0 L/min or more, even more preferably 10 L/min or more, and the upper limit may be, though not specifically limited thereto, generally 100 L/min or less.

For fluid circulation, optionally a pump 11 may be used, as shown in FIG. 1. The type of the pump is not specifically limited. In consideration of the fluid circulation amount and the necessary head, the type may be appropriately selected from a centrifugal pump, a mixed flow pump, an axial flow pump, or a positive-displacement pump. Depending on the reaction product and the unreacted raw material contained in the fluid, an impeller may be employed for a centrifugal pump, and in the case where a piston part may be worn in a positive-displacement pump, for example, a slurry pump may be employed, and further a pump resistant to a solid-containing fluid, such as a gravel pump or a sand pump may also be employed.

For circulation control, for example, the valve 13b on the ejection side of the pump 11 shown in FIG. 1 that can act as a flow rate control valve may be operated for continuous circulation control, or a flow rate control pump may be selected and used.

For temperature control in the reactor, a heater or a cooler may be arranged inside and/or outside the reactor depending on the desired temperature. For example, in the case where the fluid in the reactor is heated, a jacket-type heater may be arranged outside the reactor, or a shell-and-tube type or electric heat exchanger may be arranged inside the reactor, or a heat exchanger may be provided in the fluid circulation line.

For the stirrer 4 to stir the raw material and the complexing agent in the reactor and for the stirring impeller 5 provided in the case of employing a mechanical agitation type mixer as the stirrer, reference may be made to the corresponding description given hereinabove.

FIG. 1 shows an embodiment where a raw material and a complexing agent are fed from the top of the reactor, but not limited thereto, these may be separately fed. For example, in the case where a raw material and a solvent are previously mixed to give a slurry as mentioned above, the slurry from a slurry preparing unit may be transferred to the reactor and a complexing agent may be fed separately into the reactor.

Though not shown in FIG. 1, in the case where the fluid in the reactor is processed for pulverization, drying or heating, a pipeline, which is for feeding the fluid to the processing unit, may be arranged on the ejection side of the pump 11 shown in FIG. 1, for feeing the fluid to the unit for such treatment. With that, reaction of a raw material and a complexing agent by stirring and further treatment for pulverization, drying or heating can be carried out continuously, and therefore a sulfide solid electrolyte can be produced more efficiently, and the mode is industrially advantageous. In the case of such a continuous system, the supply amount of the complexing agent and the raw material may be controlled depending on the supply amount of the fluid to the other device unit.

(Pulverization)

In the production method of the present embodiment, the reaction product obtained by stirring as above, or an amorphous or crystalline sulfide solid electrolyte to be obtained after drying the contents-containing fluid to be mentioned below may be optionally pulverized. By pulverizing the reaction product or the electrolyte precursor, a sulfide solid electrolyte having a small particle size can be obtained while suppressing reduction in the ionic conductivity, and therefore the mode is advantageous in the case of desiring a small particle size.

The pulverization of the reaction product and the electrolyte precursor in the present embodiment is not for obtaining an amorphous or crystalline sulfide solid electrolyte by reacting raw materials by mechanical stress, for example, as disclosed in PTL 5, but is just for pulverization into fine particles.

The pulverizer for use for pulverizing the reaction product and the electrolyte precursor may be any one capable of pulverizing particles with no specific limitation, and for example, a medium-assisted pulverizer using a pulverizing medium can be used. In consideration of the fact that the reaction product is in a liquid state or in a slurry state mainly accompanied by liquids, such as the complexing agent and the solvent, a wet-type pulverizer capable of coping with wet pulverization is preferred. These pulverizers attain not only pulverization but also substantially mixing at the same time, that is, they attain pulverization mixing.

Representative examples of the wet-type pulverizer include a wet-type bead mill, a wet-type ball mill, and a wet-type vibration mill, and a wet-type bead mill using beads as a pulverization medium is preferred from the standpoint that it is able to freely adjust the condition of a pulverization operation and is easy to cope with materials having a smaller particle diameter. In addition, a dry-type pulverizer, such as a dry-type medium type pulverizer, e.g., a dry-type bead mill, a dry-type ball mill, and a dry-type vibration mill, and a dry-type non-medium pulverizer, e.g., a jet mill, can also be used.

As the pulverizer which is used for pulverization of the reaction product and the electrolyte precursor, a machine capable of pulverizing an object using ultrasonic waves, for example, a machine called an ultrasonic pulverizer, an ultrasonic homogenizer or a probe ultrasonic pulverizer can be used.

Although an average particle diameter ($D_{50}$) of the reaction product and the electrolyte precursor which is obtained through pulverization is appropriately determined according to the desire, it is typically 0.01 μm or more and 50 μm or less, preferably 0.03 μm or more and 5 μm or less, more preferably 0.05 μm or more and 3 μm or less. By taking such an average particle diameter, it becomes possible to cope with the desire of a sulfide solid electrolyte having a small particle diameter as 1 μm or less in terms of an average particle diameter.

The pulverization may be performed after drying the contents-containing fluid to give a powder (electrolyte precursor) as mentioned above.

In this case, among the aforementioned pulverizers as exemplified as the pulverizer which may be used in the production method of the present embodiment, any one of the dry-type pulverizers is preferably used. Besides, the items regarding the pulverization, such as a pulverization condition, are the same as those in the pulverization of the contents-containing fluid, and the average particle diameter of the reaction product and the electrolyte precursor obtained through pulverization is also the same as that mentioned above.

(Drying)

The production method of the present embodiment may include drying of the contents-containing fluid (typically, slurry). According to this, a powder of the electrolyte precursor is obtained. That is, the reaction product and the electrolyte precursor are substantially the same.

By performing drying in advance, it becomes possible to more efficiently perform heating the contents-containing fluid. The drying and the subsequent heating may be performed in the same process.

The contents-containing fluid can be dried at a temperature according to the kind of the remaining complexing agent (complexing agent not incorporated into the reaction product) and the solvent that is optionally used. For example, the drying can be performed at a temperature of not lower than the boiling point of the complexing agent.

The drying can be performed through drying under reduced pressure (vacuum drying) by using a vacuum pump or the like at typically 5 to 100° C., preferably 10 to 85° C., more preferably 15 to 70° C., and still more preferably around room temperature (23° C.) (for example, (room temperature)±about 5° C.), to volatilize the complexing agent and the optional solvent.

Different from the complexing agent, the solvent is hardly taken in the reaction product, and therefore the solvent to be taken in the reaction product is generally 3% by mass or less, preferably 2% by mass or less, more preferably 1% by mass or less.

Figure 3:
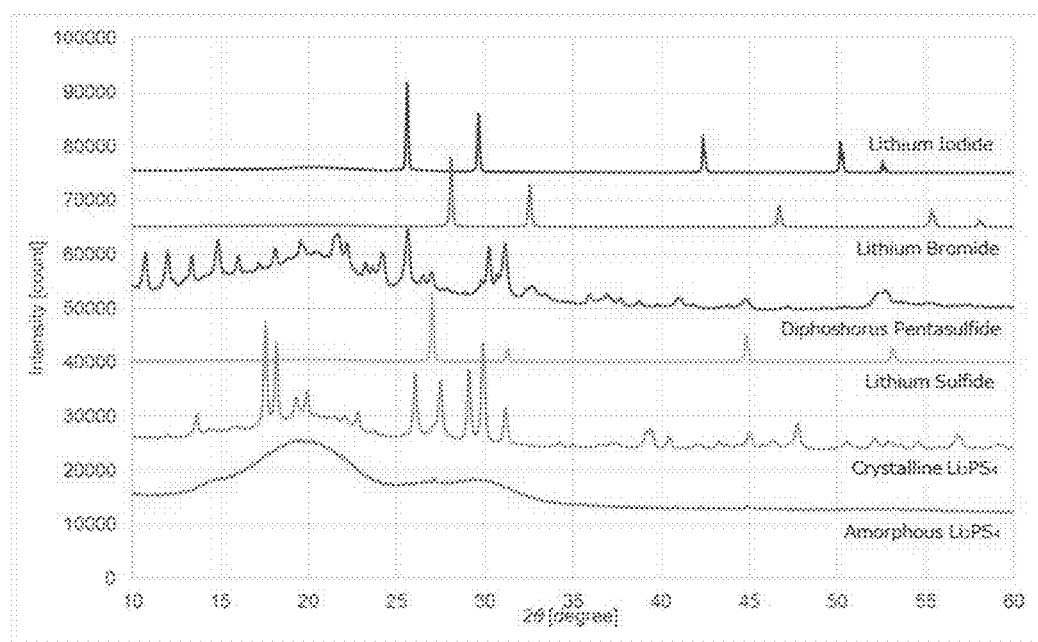
FIG. 3 This shows X-ray diffraction spectra of raw materials used in Examples.

The reaction product is characterized in that, as mentioned above, as a result of reaction of the complexing agent with a lithium atom, a sulfur atom, a phosphorus atom and a halogen atom, these atoms bond (in coordination) to each other via the complexing agent and/or directly not via the complexing agent, and that in X-ray diffractometry, the X-ray diffraction pattern thereof shows peaks different from the peaks derived from the raw materials. The reaction product contains a co-crystal constituted of the complexing agent, a lithium atom, a sulfur atom, a phosphorus atom, and a halogen atom. When only the raw material compounds are merely mixed, the peaks derived from the raw materials are merely observed, whereas when the raw material compounds and the complexing agent are mixed, peaks different from the peaks derived from the raw materials are observed. Thus, the reaction product (co-crystal) has a structure explicitly different from the raw material compounds themselves. This matter is specifically confirmed in the section of Examples. Measurement examples of the X-ray diffraction patterns of the electrolyte precursor obtained by drying the reaction product (co-crystal) and the respective raw materials, such as lithium sulfide, are shown in FIGS. 2 and 3, respectively. Since the electrolyte precursor is substantially the same as the reaction product, as described above, the electrolyte precursor also contains a co-crystal, and since the peaks in the X-ray diffraction pattern are caused by the co-crystal, the electrolyte precursor and the reaction product (co-crystal) show substantially the same peaks. It is known from the X-ray diffraction patterns that the reaction product (co-crystal) has a predetermined crystal structure. The diffraction pattern of the reaction product does not contain the diffraction patterns of any raw materials, such as lithium sulfide, as shown in FIG. 3, and also the diffraction patterns of amorphous and crystalline $Li_3PS_4$ shown for reference and thus, it is noted that the reaction product (co-crystal) has a crystal structure different from those of the raw materials.

The reaction product (co-crystal) has such a characteristic feature that it has a structure different from the crystalline sulfide solid electrolyte. This matter is also specifically confirmed in the section of Examples. The X-ray diffraction pattern of the crystalline sulfide solid electrolyte is also shown in FIG. 2, and it is noted that the foregoing diffraction pattern is different from the diffraction pattern of the reaction product (co-crystal). The reaction product (co-crystal) has the predetermined crystal structure and is also different from the amorphous sulfide solid electrolyte having a broad pattern as shown in FIG. 2.

The co-crystal is constituted of the complexing agent, the lithium atom, the sulfur atom, the phosphorus atom, and the halogen atom, and typically, it may be presumed that a complex structure in which the lithium atom and the other atoms are bound directly with each other via and/or not via the complexing agent is formed.

Here, the fact that the complexing agent constitutes the co-crystal can be, for example, confirmed through gas chromatography analysis. Specifically, the complexing agent contained in the co-crystal can be quantitated by dissolving a powder of the reaction product in methanol and subjecting the obtained methanol solution to gas chromatography analysis.

Although the content of the complexing agent in the reaction product varies with the molecular weight of the complexing agent, it is typically about 10% by mass or more and 70% by mass or less, and preferably 15% by mass or more and 65% by mass or less.

In the production method of the present embodiment, what the co-crystal containing the halogen atom is formed is preferred from the standpoint of enhancing the ionic conductivity. By using the complexing agent, the lithium-containing structure, such as a $PS_4$ structure, and the lithium-containing compound, used as raw materials, such as a lithium halide, are bound (coordinated) with each other via the complexing agent, the co-crystal in which the halogen atom is more likely dispersed and fixed is readily obtained, and the ionic conductivity is enhanced.

The matter that the halogen atom in the reaction product constitutes the co-crystal can be confirmed from the fact that even when the solid-liquid separation of the contents-containing fluid is performed, the predetermined amount of the halogen atom is contained in the reaction product. This is because the halogen atom which does not constitute the co-crystal is easily eluted as compared with the halogen atom constituting the co-crystal and discharged into the liquid of solid-liquid separation. In addition, the foregoing matter can also be confirmed from the fact that by performing composition analysis through ICP analysis (inductively coupled plasma atomic emission spectrophotometry) of the reaction product or the sulfide solid electrolyte, a proportion of the halogen atom in the reaction product or the sulfide solid electrolyte is not remarkably lowered as compared with a proportion of the halogen atom fed from the raw materials.

The amount of the halogen atom remaining in the reaction product is preferably 30% by mass or more, more preferably 35% by mass or more, and still more preferably 40% by mass or more relative to the charged composition. An upper limit of the amount of the halogen atom remaining in the reaction product is 100% by mass.

(Heating)

It is preferred that the production method of a sulfide solid electrolyte of the present embodiment includes heating the reaction product and the electrolyte precursor obtained by drying as above to give an amorphous sulfide solid electrolyte; and heating the reaction product, the electrolyte precursor or the amorphous sulfide solid electrolyte to give a crystalline sulfide solid electrolyte. By heating, the complexing agent in the reaction product and the electrolyte precursor is removed to give an amorphous sulfide solid electrolyte and a crystalline sulfide solid electrolyte containing a lithium atom, a sulfur atom, a phosphorus atom and a halogen atom. The reaction product and the electrolyte precursor to be heated in the present embodiment may be a pulverized reaction product or a pulverized electrolyte precursor that has been pulverized by pulverization of the above-mentioned treatment.

Here, the fact that the complexing agent in the reaction product and the electrolyte precursor is removed is supported by the facts that in addition to the fact that it is obvious from the results of the X-ray diffraction pattern or the gas chromatography analysis that the complexing agent constitutes the co-crystal of the reaction product or the electrolyte precursor, the sulfide solid electrolyte obtained by removing the complexing agent through heating of the reaction product or the electrolyte precursor is identical in the X-ray diffraction pattern with the sulfide solid electrolyte obtained by the conventional method without using the complexing agent.

In the production method of the present embodiment, a crystalline sulfide solid electrolyte may be obtained by heating the reaction product or the electrolyte precursor, or may be obtained by first heating the reaction product or the electrolyte precursor to give an amorphous sulfide solid electrolyte and then further by heating the resultant amorphous sulfide solid electrolyte. Namely, according to the production method of the present embodiment, an amorphous sulfide solid electrolyte can also be produced.

In the production method of the present embodiment, whether or not an amorphous sulfide solid electrolyte is obtained, whether or not a crystalline sulfide solid electrolyte is obtained, whether or not after obtaining an amorphous sulfide solid electrolyte, a crystalline sulfide solid electrolyte is obtained, or whether or not a crystalline sulfide solid electrolyte is obtained directly from the reaction product or the electrolyte precursor is appropriately selected according to the desire, and is able to be adjusted by the heating temperature, the heating time, etc.

For example, in the case of obtaining an amorphous sulfide solid electrolyte, the heating temperature may be determined according to the structure of the crystalline sulfide solid electrolyte to be obtained and could not be indiscriminately defined. In general, the heating temperature is preferably 135° C. or lower, more preferably 130° C. or lower, and still more preferably 125° C. or lower. Although a lower limit of the heating temperature is not particularly limited, it is preferably 90° C. or higher, more preferably 100° C. or higher, and still more preferably 105° C. or higher.

Although the heating temperature for obtaining a crystalline sulfide solid electrolyte cannot be unequivocally prescribed because it varies with the structure of the resulting crystalline sulfide solid electrolyte, in general, it is preferably 130° C. or higher, more preferably 135° C. or higher, and still more preferably 140° C. or higher. Although an upper limit of the heating temperature is not particularly limited, it is preferably 300° C. or lower, more preferably 280° C. or lower, and still more preferably 250° C. or lower.

Although the heating time is not particularly limited so long as it is a time for which the desired amorphous sulfide solid electrolyte or crystalline sulfide solid electrolyte is obtained, it may be generally 1 minute or more and 24 hours or less.

Preferably, heating is performed in an inert gas atmosphere (for example, a nitrogen atmosphere and an argon atmosphere) or in a reduced pressure atmosphere (especially, in vacuum).

(Amorphous Sulfide Solid Electrolyte)

The amorphous sulfide solid electrolyte which is obtained by the production method of the present embodiment contains the lithium element, the sulfur element, the phosphorus element, and the halogen element. As representative examples thereof, there are preferably exemplified solid electrolytes constituted of lithium sulfide, phosphorus sulfide, and a lithium halide, such as $Li_2S$—$P_2S_5$—LiI, $Li_2S$—$P_2S_5$—LiCl, $Li_2S$—$P_2S_5$—LiBr, and $Li_2S$—$P_2S_5$—LiI—LiBr; and solid electrolytes further containing other element, such as an oxygen element and a silicon element, for example, $Li_2S$—$P_2S_5$—$Li_2O$—LiI and $Li_2S$—$SiS_2$—$P_2S_5$—LiI. From the viewpoint of obtaining a higher ionic conductivity, solid electrolytes constituted of lithium sulfide, phosphorus sulfide, and a lithium halide, such as $Li_2S$—$P_2S_5$—LiI, $Li_2S$—$P_2S_5$—LiCl, $Li_2S$—$P_2S_5$—LiBr, and $Li_2S$—$P_2S_5$—LiI—LiBr, are preferred.

The kinds of the elements constituting the amorphous sulfide solid electrolyte can be confirmed by, for example, an inductivity coupled plasma optical emission spectrometer (ICP).

In the case where the amorphous sulfide solid electrolyte obtained in the production method of the present embodiment is one having at least $Li_2S$—$P_2S_5$, from the viewpoint of obtaining a higher ionic conductivity, a molar ratio of $Li_2S$ to $P_2S_5$ is preferably (65 to 85)/(15 to 35), more preferably (70 to 80)/(20 to 30), and still more preferably (72 to 78)/(22 to 28).

In the case where the amorphous sulfide solid electrolyte obtained in the production method of the present embodiment is $Li_2S$—$P_2S_5$—LiI—LiBr, the total content of lithium sulfide and phosphorus pentasulfide is preferably 60 to 95 mol %, more preferably 65 to 90 mol %, and still more preferably 70 to 85 mol %. In addition, a proportion of lithium bromide relative to the total of lithium bromide and lithium iodide is preferably 1 to 99 mol %, more preferably 20 to 90 mol %, still more preferably 40 to 80 mol %, and especially preferably 50 to 70 mol %.

In the amorphous sulfide solid electrolyte obtained in the production method of the present embodiment, a blending ratio (molar ratio) of lithium element to sulfur element to phosphorous element to halogen atom is preferably (1.0 to 1.8)/(1.0 to 2.0)/(0.1 to 0.8)/(0.01 to 0.6), more preferably (1.1 to 1.7)/(1.2 to 1.8)/(0.2 to 0.6)/(0.05 to 0.5), and still more preferably (1.2 to 1.6)/(1.3 to 1.7)/(0.25 to 0.5)/(0.08 to 0.4). In addition, in the case of using a combination of bromine and iodine as the halogen element, a blending ratio (molar ratio) of lithium element to sulfur element to phosphorus element to bromine to iodine is preferably (1.0 to 1.8)/(1.0 to 2.0)/(0.1 to 0.8)/(0.01 to 0.3)/(0.01 to 0.3), more preferably (1.1 to 1.7)/(1.2 to 1.8)/(0.2 to 0.6)/(0.02 to 0.25)/(0.02 to 0.25), still more preferably (1.2 to 1.6)/(1.3 to 1.7)/(0.25 to 0.5)/(0.03 to 0.2)/(0.03 to 0.2), and yet still more preferably (1.35 to 1.45)/(1.4 to 1.7)/(0.3 to 0.45)/(0.04 to 0.18)/(0.04 to 0.18). By allowing the blending ratio (molar ratio) of lithium element to sulfur element to phosphorus element to halogen element to fall within the aforementioned range, it becomes easy to provide a solid electrolyte having a thio-LISICON Region II-type crystal structure and having a higher ionic conductivity.

The residual amount of $Li_2S$ remaining in the amorphous sulfide solid electrolyte obtained according to the production method of the present embodiment is generally 15.0% or less, preferably 10.0% or less, more preferably 7.5% or less, even more preferably 5.5% or less. The residual amount of $Li_2S$ is the amount of unreacted $Li_2S$ in the reaction site where $Li_2S$ is used as a raw material, which is determined according to the method described in the section of Examples, and this is a numerical value to be an index in perceiving the procedure of the reaction of the raw material, more specifically in perceiving the process procedure where the raw material has come to constitute the resultant sulfide solid electrolyte. That is, a smaller residual amount of $Li_2S$ means that the amount of unreacted $Li_2S$ is small and $Li_2S$ has contributed toward constituting the sulfide solid electrolyte. Accordingly, the residual amount of $Li_2S$ in the amorphous sulfide solid electrolyte is preferably smaller, and is generally approximately 0.5% or more.

Although the shape of the amorphous sulfide solid electrolyte is not particularly restricted, examples thereof include a granular shape. The average particle diameter ($D_{50}$) of the granular amorphous sulfide solid electrolyte is, for example, within a range of 0.01 to 500 μm, and preferably 0.1 to 200 μm.

(Crystalline Sulfide Solid Electrolyte)

The crystalline sulfide solid electrolyte obtained by the production method of the present embodiment may be a so-called glass ceramics which is obtained by heating the amorphous sulfide solid electrolyte to a crystallization temperature or higher. Examples of a crystal structure thereof include an $Li_3PS_4$ crystal structure, an $Li_4P_2S_6$ crystal structure, an $Li_7PS_6$ crystal structure, an $Li_7P_3S_{11}$ crystal structure, and a crystal structure having peaks at around $2\theta=20.2°$ and 23.6° (see, for example, JP 2013-16423 A).

In addition, examples thereof include an $Li_{4-x}Ge_{1-x}P_xS_4$-based thio-LISICON Region II-type crystal structure (see Kanno, et al., Journal of The Electrochemical Society, 148 (7) A742-746 (2001)) and a crystal structure similar to the $Li_{4-x}Ge_{1-x}P_xS_4$-based thio-LISICON Region II-type crystal structure (see Solid State Ionics, 177 (2006), 2721-2725). Among them, the thio-LISICON Region II-type crystal structure is preferred as the crystal structure of the crystalline sulfide solid electrolyte obtained by the production method of the present embodiment from the standpoint that a higher ionic conductivity is obtained. Here, the "thio-LISICON Region II-type crystal structure" expresses any one of an $Li_{4-x}Ge_{1-x}P_xS_4$-based thio-LISICON Region II-type crystal structure and a crystal structure similar to the $Li_{4-x}Ge_{1-x}P_xS_4$-based thio-LISICON Region II-type crystal structure. In addition, though the crystalline sulfide solid electrolyte obtained by the production method of a solid electrolyte of the present embodiment may be one having the aforementioned thio-LISICON Region II-type crystal structure or may be one having the thio-LISICON Region II-type crystal structure as a main crystal, it is preferably one having the thio-LISICON Region II-type crystal structure as a main crystal from the standpoint that a higher ionic conductivity is obtained. In this specification, the wording "having as a main crystal" means that a proportion of the crystal structure serving as an object in the crystal structure is 80% or more, and it is preferably 90% or more, and more preferably 95% or more. In addition, from the viewpoint of obtaining a higher ionic conductivity, the crystalline sulfide solid electrolyte obtained by the production method of a solid electrolyte of the present embodiment is preferably one not containing crystalline $Li_3PS_4$ ($\beta$-$Li_3PS_4$).

In the X-ray diffractometry using a CuKα ray, the $Li_3PS_4$ crystal structure gives diffraction peaks, for example, at around $2\theta=17.5°$, 18.3°, 26.1°, 27.3°, and 30.0°; the $Li_4P_2S_6$ crystal structure gives diffraction peaks, for example, at around $2\theta=16.9°$, 27.1°, and 32.5°; the $Li_7PS_6$ crystal structure gives diffraction peaks, for example, at around $2\theta=15.3°$, 25.2°, 29.6°, and 31.0°; the $Li_7P_3S_{11}$ crystal structure gives diffraction peaks, for example, at around $2\theta=17.8°$, 18.5°, 19.7°, 21.8°, 23.7°, 25.9°, 29.6°, and 30.0°; the $Li_{4-x}Ge_{1-x}P_xS_4$-based thio-LISICON Region II-type crystal structure gives diffraction peaks, for example, at around $2\theta=20.1°$, 23.9°, and 29.5°; and the crystal structure similar to the $Li_{4-x}Ge_{1-x}P_xS_4$-based thio-LISICON Region II-type crystal structure gives diffraction peaks, for example, at around $2\theta=20.2°$ and 23.6°. The position of these peaks may vary within a range of ±0.5°.

As mentioned above, in the case when the thio-LISICON Region II-type crystal structure is obtained in the present embodiment, the foregoing crystal structure is preferably one not containing crystalline $Li_3PS_4$ ($\beta$-$Li_3PS_4$). FIG. 2 shows an X-ray diffractometry example of the crystalline sulfide solid electrolyte obtained by the production method of the present embodiment. In addition, FIG. 3 shows an X-ray diffractometry example of crystalline $Li_3PS_4$ ($\beta$-$Li_3PS_4$). As grasped from FIGS. 2 and 3, the sulfide solid electrolyte obtained according to the production method of the present embodiment does not have diffraction peaks at $2\theta=17.5°$ and 26.1° shown in the crystalline $Li_3PS_4$, or even in the case where it has diffraction peaks, extremely small peaks as compared with the diffraction peaks of the thio-LISICON Region II-type crystal structure are merely detected.

The crystal structure represented by a compositional formula $Li_{7-x}P_{1-y}Si_yS_6$ or $Li_{7+x}P_{1-y}Si_yS_6$ (x is −0.6 to 0.6, and y is 0.1 to 0.6), which has the aforementioned structure skeleton of $Li_7PS_6$ and in which a part of P is substituted with Si, is a cubic crystal or a rhombic crystal, and is preferably a cubic crystal, and in X-ray diffractometry using a CuKα ray, the crystal structure gives peaks appearing mainly at $2\theta=15.5°$, 18.0°, 25.0°, 30.0°, 31.4°, 45.3°, 47.0°, and 52.0°. The crystal structure represented by the aforementioned compositional formula $Li_{7-x-2y}PS_{6-x-y}Cl_x$ ($0.8 \leq x \leq 1.7$, and $0 < y \leq (-0.25x+0.5)$) is preferably a cubic crystal, and in the X-ray diffractometry using a CuKα ray, the crystal structure gives peaks appearing mainly at $2\theta=15.5°$, 18.0°, 25.0°, 30.0°, 31.4°, 45.3°, 47.0°, and 52.0°. The crystal structure represented by the aforementioned compositional formula $Li_{7-x}PS_{6-x}Ha_x$ (Ha represents Cl or Br, and x is preferably 0.2 to 1.8) is preferably a cubic crystal, and in the X-ray diffractometry using a CuKα ray, the crystal structure gives peaks appearing mainly at $2\theta=15.5°$, 18.0°, 25.0°, 30.0°, 31.4°, 45.3°, 47.0°, and 52.0°.

These peak positions may vary within a range of ±0.5°.

Although the shape of the crystalline sulfide solid electrolyte is not particularly restricted, examples thereof include a granular shape. The average particle diameter ($D_{50}$) of the granular amorphous sulfide solid electrolyte is, for example, within a range of 0.01 μm to 500 μm, and preferably 0.1 to 200 μm.

The sulfide solid electrolyte which is obtained by the production method of the present embodiment has a high ionic conductivity and also has an excellent battery performance, so that it is suitably used for batteries. In the case of adopting a lithium element as the conduction species, such is especially suitable. The sulfide solid electrolyte obtained by the production method of the present embodiment may be used for a positive electrode layer, may be used for a negative electrode layer, or may be used for an electrolyte layer. Each of the layers can be produced by a known method.

The aforementioned battery preferably uses a collector in addition to the positive electrode layer, the electrolyte layer, and the negative electrode layer, and the collector can be any known one. For example, a layer formed by coating Au, Pt, Al, Ti, Cu, or the like capable of reacting with the aforementioned solid electrolyte, with Au or the like can be used.

EXAMPLES

Next, the present invention is described specifically with reference to Examples, but it should be construed that the present invention is by no means restricted by these Examples.

Example 1

In a nitrogen atmosphere, 13.60 g of lithium sulfide ($Li_2S$), 21.93 g of diphosphorus pentasulfide ($P_2S_5$), 4.28 g of lithium bromide (LiBr) and 6.60 g of lithium iodide (LiI) were introduced into a Schlenk flask (capacity: 500 mL) equipped with a stirring bar. After the stirring bar was rotated, 400 mL of cyclohexane was added to give a cyclohexane slurry containing lithium sulfide, diphosphorus pentasulfide, lithium bromide and lithium iodide as raw materials and containing cyclohexane as a solvent.

For stirring the raw materials and a complexing agent, an apparatus having the constitution shown in FIG. 1 was used. In the apparatus, the reactor is a separable flask (capacity: 500 mL) and the stirring impeller is an anchor-type stirring impeller. A discharging port was arranged at the bottom of the separable flask, and a returning port was arranged lower than the liquid level of the fluid in the reactor.

The resultant cyclohexane slurry was transferred to the reactor, and 103 mL of tetramethylethylenediamine (TMEDA) as a complexing agent was added thereto. The rotation number of the stirring impeller was set at 200 rpm, and the pump flow rate was at 550 mL/min, and while the fluid in the reactor was circulated, the fluid in the reactor was started to be stirred. The temperature inside the reactor was room temperature (23° C.). After 360 hours (stirring time) from the start, the resultant fluid was dried under reduced pressure at room temperature to give a powdery electrolyte precursor. Next, this was heated at 110° C. under reduced pressure for 2 hours to remove the complexing agent having remained in the electrolyte precursor to give an amorphous solid electrolyte.

Figure 4:
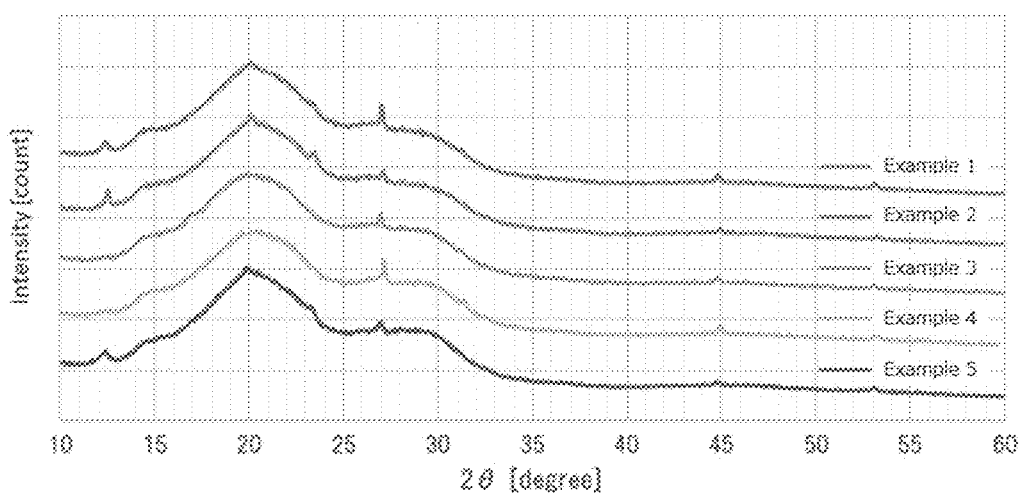
FIG. 4 This shows X-ray diffraction spectra of amorphous sulfide solid electrolytes obtained in Examples.

The resultant amorphous sulfide solid electrolyte was analyzed through powdery X-ray diffractometry (XRD) according to the following method. The residual amount of $Li_2S$ in the amorphous sulfide solid electrolyte was calculated and was 4%. Among the solid compounds used as raw materials, lithium sulfide, diphosphorus pentasulfide, lithium bromide and lithium iodide, the density difference between lithium iodide having a highest density (density: 4.08 g/cm³) and lithium sulfide having a lowest density (density: 1.66 g/cm³) was 2.42 g/cm³. Composition analysis was carried out by ICP (induction coupled plasma) emission spectrometry. In Example 1, the experimental condition is shown in Table 1, the measurement results are in Table 2, and the XRD results are in FIG. 4.

Further, the amorphous sulfide solid electrolyte was heated under reduced pressure at 200° C. for 2 hours to give a crystalline sulfide solid electrolyte. Like the above amorphous sulfide solid electrolyte, the resultant crystalline sulfide solid electrolyte was analyzed through XRD, and in the XRD spectrum thereof, crystallization peaks were detected mainly at $2\theta=20.2°$ and $23.6°$, that is, the sulfide solid electrolyte had a thio-LISICON Region II-type crystal structure, but no diffraction peaks were detected at $2\theta=17.5°$ and $26.1°$. The ionic conductivity was measured and was $2.5\times10^{-3}$ (S/cm). Thus, the sulfide solid electrolyte was confirmed to have a high ionic conductivity. The results are shown in Table 2.

(Powdery XRD Analysis and Measurement of Residual Amount of $Li_2S$)

Powdery X-ray diffractometry (XRD) and calculation of residual $Li_2S$ was carried out as follows.

A powder of the electrolyte precursor and the amorphous sulfide solid electrolyte produced in Examples and Comparative Examples was filled in a groove having a diameter of 20 mm and a depth of 0.2 mm, and leveled with glass to prepare a sample. The sample was sealed up with an XRD kapton film, and analyzed under the following condition, while kept away from contact with air. In addition, the raw materials used in Examples were also analyzed through powdery X-ray diffractometry (XRD) like the amorphous sulfide solid electrolyte. The residual amount of $Li_2S$ is the amount of unreacted $Li_2S$ in the reaction site where lithium sulfide ($Li_2S$) is used as a raw material, and this is a numerical value to be an index in perceiving the procedure of the reaction of the raw material, more specifically in perceiving the process procedure where the raw material has come to constitute the resultant sulfide solid electrolyte. That is, a smaller residual amount of $Li_2S$ means that the amount of unreacted $Li_2S$ is small and $Li_2S$ has contributed toward constituting the sulfide solid electrolyte.

Measurement Apparatus: D2 PHASER by Bruker Corporation
Tube voltage: 30 kV
Tube current: 10 mA
X-ray wavelength: Cu-Kα ray (1.5418 Å)
Optical system: concentration technique
Slit configuration: solar slit 4°, scattering slit 1 mm, using Kβ filter (Ni plate)
Detector: semiconductor detector
Measurement range: $2\theta=10$ to $60$ deg
Step width, scan speed: 0.05 deg, 0.05 deg/sec The residual amount of $Li_2S$ was analyzed using a function of Excel Solver for confirming the residual amount of raw material from the above-mentioned measurement results. Of raw data, $2\theta$ is designated as A, and the peak intensity is as B, and the base line sued for calculation and the glass intensity are as C and D, respectively. In calculation of the base line and in calculation of the peak intensity, these are calculated relative to each $2\theta$ experientially as follows, from the measurement system.

$$C=-45.72\times A+4600-457.2$$

The glass intensity D is calculated according to the following numerical formula, in which the peak angle is E, F, G or H, the width is I, J, K or L, and the intensity is M, N, O or P.

$$D=M\times e^{(-((A-E)^2/I^2/2))/\sqrt{2\pi}I}+N\times e^{(-((A-F)^2/J^2/2))/\sqrt{2\pi}J}+O\times e^{(-((A-G)^2/K^2/2))/\sqrt{2\pi}K}+P\times e^{(-((A-H)^2/L^2/2))/\sqrt{2\pi}L}$$

The background correction data for calculation is designated as Q, and is as follows.

$$Q=B-C$$

The peak shift of the $Li_2S$ peak to be calculated from the peak position at the reaction initial stage of the raw material $Li_2S$ is designated as R, and R is added to all the peaks so as to be reflected on the above Q. The peak intensity in the reaction initial stage of $Li_2S$ is designated as S, and the peak intensity S in the reaction initial stage is multiplied by a coefficient T for peak intensity fitting. The fitting residues are totaled to be U, as follows.

$$U=\Sigma(Q-T\times S-C)$$

In calculation using the Solver function, E, F, G, H, I, J, K, L, M, N, O, P, R and T are variables, and U is calculated to be minimum in a non-linear GRG, and the residual Li$_2$S amount is subjected to fitting.

In the present Examples, the ionic conductivity was measured as follows.

The resultant crystalline sulfide solid electrolyte was molded to give circular pellets each having a diameter of 10 mm (sectional area S: 0.785 cm$^2$) and a height (L) of 0.1 to 0.3 cm to be samples. Electrode terminal were taken from upper and lower surfaces of each sample, and measurement was made according to an alternating-current impedance method at 25° C. (frequency range: 5 MHz to 0.5 Hz, amplitude: 10 mV) to draw a Cole-Cole plotting. In the vicinity of the right end of the arc observed in the high-frequency side region, the real part Z' ($\Omega$) at a point at which −Z" ($\Omega$) is the smallest is designated as a bulk resistance R ($\Omega$) of the electrolyte, and the ionic conductivity $\sigma$ (S/cm) was calculated according to the following formulae.

$$R = \rho(L/S)$$

$$\sigma = 1/\rho$$

Example 2

In a nitrogen atmosphere, 15.87 g of lithium sulfide (Li$_2$S) was introduced into a Schlenk flask (capacity: 500 mL) equipped with a stirring bar. After the stirring bar was rotated, 300 mL of cyclohexane was added, and then 6.26 g of iodine (I$_2$) was added and stirred at room temperature for 2 hours. Subsequently, 3.94 g of bromine (Br$_2$) was added and stirred at room temperature for 12 hours, and further stirred at 50° C. for 3 hours. The slurry was subjected to decantation by statically leaving it as such for solid precipitation, removing 190 mL of the supernatant, and thereafter adding 190 mL of cyclohexane. The decantation was repeated three times to wash off the sulfur molecules produced as side products by the reaction of lithium sulfide, bromine and iodine, thereby giving a cyclohexane slurry containing lithium sulfide, lithium bromide and lithium iodide as raw materials.

21.93 g of diphosphorus pentasulfide (P$_2$S$_5$) and 100 mL of cyclohexane were added to the resultant cyclohexane slurry (the total amount of cyclohexane is 400 mL), and the resultant mixture was transferred to the reactor of the apparatus used in Example 1, and 103 mL of tetramethylethylenediamine (TMEDA) as a complexing agent was added thereto. The fluid in the reactor contains lithium sulfide, diphosphorus pentasulfide, lithium bromide and lithium iodide as raw materials, TMEDA as a complexing agent and cyclohexane as a solvent.

The rotation number of the stirring impeller was set at 200 rpm, and the pump flow rate was at 550 mL/min, and while the fluid in the reactor was circulated, the fluid in the reactor was started to be stirred. The temperature inside the reactor was room temperature (23° C.). After 300 hours (stirring time) from the start, the resultant fluid was dried under reduced pressure at room temperature to give a powdery electrolyte precursor. Next, this was heated at 110° C. under reduced pressure for 2 hours to remove the complexing agent having remained in the electrolyte precursor to give an amorphous solid electrolyte.

The resultant amorphous solid electrolyte was analyzed through powdery X-ray diffractometry (XRD) according to the above-mentioned method. The residual amount of Li$_2$S in the amorphous sulfide solid electrolyte was calculated and was 2%. Further, composition analysis was carried out by ICP (induction coupled plasma) emission spectrometry. In Example 2, the experimental condition is shown in Table 1, the measurement results are in Table 2, and the XRD results are in FIG. 4.

Next, a crystalline sulfide solid electrolyte was produced in the same manner as in Example 1. The ionic conductivity of the resultant crystalline sulfide solid electrolyte was measured and was 2.1×10$^{-3}$ (S/cm). Thus, the sulfide solid electrolyte was confirmed to have a high ionic conductivity. The results are shown in Table 2.

Example 3

In a nitrogen atmosphere, 439.5 g of lithium sulfide (Li$_2$S), 708.6 g of diphosphorus pentasulfide (P$_2$S$_5$), 138.5 g of lithium bromide (LiBr) and 213.4 g of lithium iodide (LiI) were introduced into a Schlenk flask (capacity: 5000 mL) equipped with a stirring bar. After the stirring bar was rotated, 4 L of cyclohexane was added to give a cyclohexane slurry containing lithium sulfide, diphosphorus pentasulfide, lithium bromide and lithium iodide as raw materials and containing cyclohexane as a solvent.

For stirring the raw materials and a complexing agent, an apparatus having the constitution shown in FIG. 1 was used. In the apparatus, the reactor has a capacity of 40 L, and the stirring impeller is an anchor-type stirring impeller. A discharging port was arranged at the bottom of the separable flask, and a returning port was arranged lower than the liquid level of the fluid in the reactor.

The resultant cyclohexane slurry was transferred to the reactor, and 27 L of cyclohexane was further added (the total amount of cyclohexane is 31.0 L), and 3.33 L of tetramethylethylenediamine (TMEDA) as a complexing agent was added thereto. The rotation number of the stirring impeller was set at 80 rpm, and the pump flow rate was at 3 L/min, and while the fluid in the reactor was circulated, the fluid in the reactor was started to be stirred. The temperature inside the reactor was 30° C. After 210 hours (stirring time) from the start, the resultant fluid was dried under reduced pressure at room temperature to give a powdery electrolyte precursor. Next, this was heated at 110° C. under reduced pressure for 2 hours to remove the complexing agent having remained in the electrolyte precursor to give an amorphous solid electrolyte.

The resultant electrolyte precursor and amorphous solid electrolyte were analyzed through powdery X-ray diffractometry (XRD). The residual amount of Li$_2$S in the amorphous sulfide solid electrolyte was calculated and was 2%. Composition analysis was carried out by ICP (induction coupled plasma) emission spectrometry. In Example 3, the experimental condition is shown in Table 1, the measurement results are in Table 2, and the XRD results are in FIG. 2.

Next, in the same manner as in Example 1, a crystalline sulfide solid electrolyte was obtained. The ionic conductivity of the resultant crystalline sulfide solid electrolyte was measured, and was 3.9×10$^{-3}$ (S/cm), which confirmed a high ionic conductivity. The results are shown in Table 2.

X-ray diffraction spectrometry of the electrolyte precursor showed peaks different from those derived from the raw materials used, and gave an X-ray diffraction pattern differing from that of an amorphous sulfide solid electrolyte and a crystalline sulfide solid electrolyte. In addition, the raw materials used in Examples (lithium bromide, lithium iodide, lithium sulfide, diphosphorus pentasulfide), and amorphous Li$_3$PS$_4$ and crystalline Li$_3$PS$_4$ prepared for reference for other X-ray diffraction patterns were also subjected to powdery X-ray diffractometry (XRD), and the X-ray diffraction spectra thereof are shown in FIG. 3. The X-ray diffraction spectrum of the electrolyte precursor showed an X-ray diffraction pattern different from those of the X-ray diffraction spectra of the raw materials.

Example 4

An electrolyte precursor and an amorphous sulfide solid electrolyte were produced in the same manner as in Example 3, except that, in Example 3, the stirring impeller in the apparatus was changed from an anchor-type impeller to an inclined paddle-type impeller and the stirring time was 230 hours. The resultant amorphous sulfide solid electrolyte was subjected to powdery X-ray diffractometry (XRD). In addition, the residual amount of $Li_2S$ in the amorphous sulfide solid electrolyte was calculated, and was 5%. Further, the composition was analyzed through ICP analysis (inductively coupled plasma atomic emission spectrophotometry). In Example 4, the experimental condition is shown in Table 1, the measurement results are in Table 2, and the XRD results are in FIG. 4. Next, in the same manner as in Example 1, a crystalline sulfide solid electrolyte was obtained. The ionic conductivity of the resultant crystalline sulfide solid electrolyte was measured, and was $2.0 \times 10^{-3}$ (S/cm), which confirmed a high ionic conductivity. The results are shown in Table 2.

Example 5

In a nitrogen atmosphere, 439.5 g of lithium sulfide ($Li_2S$), 708.6 g of diphosphorus pentasulfide ($P_2S_5$), 138.5 g of lithium bromide (LiBr) and 213.4 g of lithium iodide (LiI) were introduced into a Schlenk flask (capacity: 5000 mL) equipped with a stirring bar. After the stirring bar was rotated, 4 L of cyclohexane was added to give a cyclohexane slurry containing lithium sulfide, diphosphorus pentasulfide, lithium bromide and lithium iodide as raw materials and containing cyclohexane as a solvent.

For stirring the raw materials and a complexing agent, an apparatus having the constitution shown in FIG. 1 was used. In the apparatus, the reactor has a capacity of 40 L, and the stirring impeller is an anchor-type stirring impeller. A discharging port was arranged at the bottom of the separable flask, and a returning port was arranged lower than the liquid level of the fluid in the reactor.

The resultant cyclohexane slurry was transferred to the reactor, and 27 L of cyclohexane was further added (the total amount of cyclohexane is 31.0 L), and 3.33 L of tetramethylethylenediamine (TMEDA) as a complexing agent was added thereto. The rotation number of the stirring impeller was set at 80 rpm, and the pump flow rate was at 3 L/min, and while the fluid in the reactor was circulated, the fluid in the reactor was started to be stirred. The temperature inside the reactor was 50° C. After 165 hours (stirring time) from the start, the resultant fluid was dried under reduced pressure at room temperature to give a powdery electrolyte precursor. Next, this was heated at 110° C. under reduced pressure for 2 hours to remove the complexing agent having remained in the electrolyte precursor to give an amorphous solid electrolyte.

The resultant amorphous solid electrolyte was analyzed through powdery X-ray diffractometry (XRD). The residual amount of $Li_2S$ in the amorphous sulfide solid electrolyte was calculated and was 2%. Composition analysis was carried out by ICP (induction coupled plasma) emission spectrometry. In Example 5, the experimental condition is shown in Table 1, the measurement results are in Table 2, and the XRD results are in FIG. 4.

Next, in the same manner as in Example 1, a crystalline sulfide solid electrolyte was obtained. The ionic conductivity of the resultant crystalline sulfide solid electrolyte was measured, and was $3.6 \times 10^{-3}$ (S/cm), which confirmed a high ionic conductivity. The results are shown in Table 2.

Comparative Example 1

Figure 5:
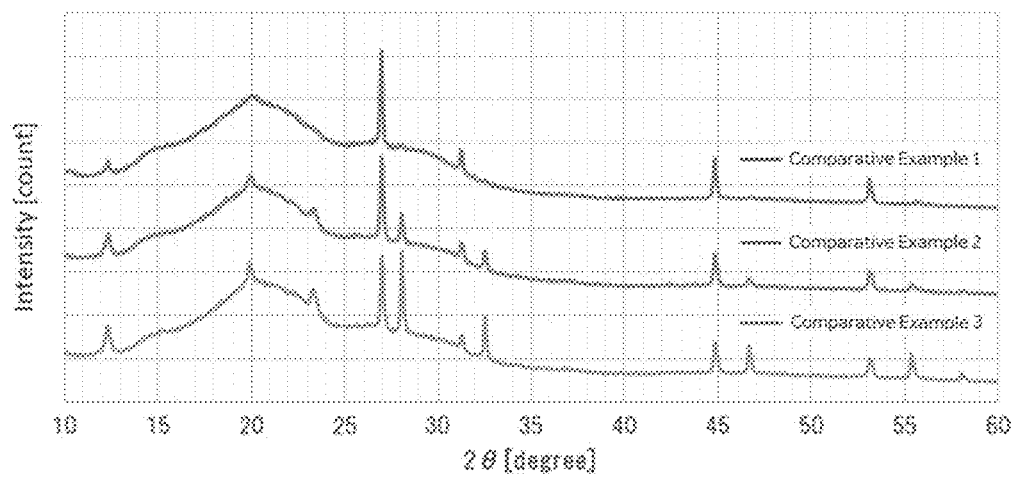
FIG. 5 This shows X-ray diffraction spectra of amorphous sulfide solid electrolytes obtained in Comparative Examples.

An electrolyte precursor, an amorphous sulfide solid electrolyte and a crystalline sulfide solid electrolyte were produced in the same manner as in Example 1, except that, in Example 1, the fluid was not circulated and the stirring time was 200 hours. In the same manner as in Example 1, the resultant amorphous sulfide solid electrolyte was subjected to powdery X-ray diffractometry (XRD), the residual amount of $Li_2S$ was calculated, composition analysis was carried out through ICP analysis, and the ionic conductivity was measured. In Comparative Example 1, the experimental condition is shown in Table 1, the measurement results are in Table 2, and the XRD results are in FIG. 5.

Comparative Example 2

An electrolyte precursor, an amorphous sulfide solid electrolyte and a crystalline sulfide solid electrolyte were produced in the same manner as in Example 1, except that, in Example 1, the fluid was not circulated, the stirring impeller was an inclined paddle-type impeller, and the stirring time was 310 hours. In the same manner as in Example 1, the resultant amorphous sulfide solid electrolyte was subjected to powdery X-ray diffractometry (XRD), the residual amount of $Li_2S$ was calculated, composition analysis was carried out through ICP analysis, and the ionic conductivity was measured. In Comparative Example 2, the experimental condition is shown in Table 1, the measurement results are in Table 2, and the XRD results are in FIG. 5.

Comparative Example 3

In a nitrogen atmosphere, 161.1 g of lithium sulfide ($Li_2S$), 259.9 g of diphosphorus pentasulfide ($P_2S_5$), 50.8 g of lithium bromide (LiBr) and 78.2 g of lithium iodide (LiI) were introduced into a Schlenk flask (capacity: 5000 mL) equipped with a stirring bar. After the stirring bar was rotated, 3 L of cyclohexane was added to give a cyclohexane slurry containing lithium sulfide, diphosphorus pentasulfide, lithium bromide and lithium iodide as raw materials and containing cyclohexane as a solvent.

For stirring the raw materials and a complexing agent, an apparatus having the constitution shown in FIG. 1 was used. In the apparatus, the reactor has a capacity of 6 L, and the stirring impeller is a full zone-type stirring impeller. A discharging port was arranged at the bottom of the separable flask, and a returning port was arranged lower than the liquid level of the fluid in the reactor.

The resultant cyclohexane slurry was transferred to the reactor, and 2.2 L of cyclohexane was further added (the total amount of cyclohexane is 5.2 L), and 1.22 L of tetramethylethylenediamine (TMEDA) as a complexing agent was added thereto. The rotation number of the stirring impeller was set at 100 rpm, and the fluid in the reactor was started to be stirred. The temperature inside the reactor was room temperature (23° C.). After 200 hours (stirring time)

from the start, the resultant fluid was dried under reduced pressure at room temperature to give a powdery electrolyte precursor. Next, this was heated at 110° C. under reduced pressure for 2 hours to remove the complexing agent having remained in the electrolyte precursor to give an amorphous solid electrolyte.

The resultant amorphous solid electrolyte was analyzed through powdery X-ray diffractometry (XRD). The residual amount of $Li_2S$ in the amorphous sulfide solid electrolyte was calculated and was 20%. Composition analysis was carried out by ICP (induction coupled plasma) emission spectrometry. In Comparative Example 3, the experimental condition is shown in Table 1, the measurement results are in Table 2, and the XRD results are in FIG. 5.

rapidly, and that the results of composition analysis almost correspond to the raw materials used with no compositional shift therebetween. According to the production method of the present embodiment, it is confirmed that a sulfide solid electrolyte can be produced efficiency using a liquid-phase method, and the resultant sulfide solid electrolyte has a high ionic conductivity. By comparison between Examples 3 and 4, it is confirmed that the type of the stirring impeller has some influence on the residual $Li_2S$ amount, that is, an anchor-type impeller can reduce the residual $Li_2S$ amount in some degree than an inclined paddle-type impeller.

On the other hand, in Comparative Examples, the fluid was not circulated and therefore, the residual $Li_2S$ amount was 20% or more and the reaction of the raw materials did

TABLE 1

| | | Raw Materials | | | | | | Complexing Agent and Solvent | | | | Fluid Circulation | Reactor Temperature | Stirring |
|---|---|---|---|---|---|---|---|---|---|---|---|---|---|---|
| | | | | | | | | Complexing Agent | | Solvent | | | | |
| | | $Li_2S$ (g) | $P_2S_5$ (g) | LiBr (g) | LiI (g) | $Br_2$ (g) | $I_2$ (g) | Kind | Amount Used L | Kind | Amount Used L | Impeller Kind | Amount L/min | ° C. | Time hr |
| Example | 1 | 13.60 | 21.93 | 4.28 | 6.60 | — | — | TMEDA | 0.103 | c-Hex | 0.4 | anchor | 0.55 | 23 | 360 |
| | 2 | 15.87 | 21.93 | — | — | 3.94 | 6.26 | TMEDA | 0.103 | c-Hex | 0.4 | anchor | 0.55 | 23 | 300 |
| | 3 | 439.5 | 708.6 | 138.5 | 213.4 | — | — | TMEDA | 3.33 | c-Hex | 31.0 | anchor | 3.0 | 23 | 210 |
| | 4 | 439.5 | 708.6 | 138.5 | 213.4 | — | — | TMEDA | 3.33 | c-Hex | 31.0 | inclined paddle | 3.0 | 23 | 230 |
| | 5 | 439.5 | 708.6 | 138.5 | 213.4 | — | — | TMEDA | 3.33 | c-Hex | 31.0 | anchor | 3.0 | 50 | 165 |
| Comparative Example | 1 | 13.60 | 21.93 | 4.28 | 6.60 | — | — | TMEDA | 0.103 | c-Hex | 0.4 | anchor | 0 | 23 | 200 |
| | 2 | 13.60 | 21.93 | 4.28 | 6.60 | — | — | TMEDA | 0.103 | c-Hex | 0.4 | inclined paddle | 0 | 23 | 310 |
| | 3 | 161.1 | 259.9 | 50.8 | 78.2 | — | — | TMEDA | 1.22 | c-Hex | 5.2 | full zone | 0 | 23 | 200 |

The raw materials shown in Table 1, as used in Examples, are as follows.
$Li_2S$: lithium sulfide (density: 1.66 g/cm$^3$)
$P_2S_5$: diphosphorus pentasulfide (density: 2.09 g/cm$^3$)
LiBr: lithium bromide (density: 3.46 g/cm$^3$)
LiI: lithium iodide (density: 4.08 g/cm$^3$)
$Br_2$: bromine
$I_2$: iodine
The complexing agent and the solvent shown in Table 1, as used in Examples, are as follows.
TMEDA: tetramethylethylenediamine (N,N,N',N-tetramethylethylenediamine)
cyc-Hex: cyclohexane not run on, and in addition, from the results of composition analysis, it is confirmed that, especially in Comparative Examples 1 and 2, the composition of lithium iodide was shifted. From these, it is obvious that the ionic conductivity of the sulfide solid electrolytes obtained in Comparative Examples, though not measured, would not come up to that of the sulfide solid electrolytes in Examples. In Comparative Examples, the residual $Li_2S$ amount was large and the compositional shift of lithium iodide occurred, and it is considered that these would be because the unreacted raw materials would precipitate and stay at the bottom of the reactor, and a good convection flow could not be attained

TABLE 2

| | | Residual $Li_2S$ Amount % | Results of Composition Analysis | | | | | Ionic Conductivity (mS/cm) |
|---|---|---|---|---|---|---|---|---|
| | | | $Li_2S$ (mol %) | $P_2S_5$ (mol %) | LiBr (mol %) | LiI (mol %) | $Li_2S/P_2S_5$ molar ratio | |
| Example | 1 | 4 | 59.7 | 20.1 | 10.1 | 10.1 | 2.97 | 2.5 |
| | 2 | 2 | 60.1 | 19.9 | 10.2 | 9.8 | 3.02 | 2.1 |
| | 3 | 4 | 59.7 | 20.0 | 10.4 | 9.9 | 2.99 | 3.9 |
| | 4 | 5 | 59.4 | 19.8 | 10.5 | 10.3 | 3.00 | 2.0 |
| | 5 | 2 | 60.6 | 20.3 | 9.5 | 9.6 | 2.99 | 3.6 |
| Comparative Example | 1 | 22 | 61.7 | 21.0 | 9.7 | 7.6 | 2.94 | — |
| | 2 | 21 | 63.5 | 21.4 | 9.6 | 5.5 | 2.97 | — |
| | 3 | 20 | 61.5 | 18.5 | 9.9 | 10.1 | 3.32 | — |

The above results in Examples confirm that, by circulating the contents-containing fluid, the residual $Li_2S$ amount is reduced and the reaction of the raw material runs on inside the reactor owing to absence of fluid circulation therethrough, and therefore the reaction could not run on in the reactor.

Example 6

In a nitrogen atmosphere, 5.86 kg of lithium sulfide ($Li_2S$), 9.45 kg of diphosphorus pentasulfide ($P_2S_5$), 1.85 kg of lithium bromide (LiBr) and 2.85 kg of lithium iodide (LiI) were introduced into a pressure-resistant reactor (made of SUS) equipped with a stirrer. 443 L of cyclohexane was added to give a cyclohexane slurry containing lithium sulfide, diphosphorus pentasulfide, lithium bromide and lithium iodide as raw materials and containing cyclohexane as a solvent.

For stirring the raw materials and a complexing agent, an apparatus having the constitution shown in FIG. 1 was used. In the apparatus, the capacity of the reactor is 600 L, and the stirring impeller is an anchor-type impeller. A discharging port was arranged at the bottom of the reactor, and a returning port was arranged lower than the liquid level of the fluid in the reactor.

As a complexing agent, 45 L of tetramethylethylenediamine (TMEDA) was added. The rotation number of the stirring impeller was set at 80 rpm, and the pump flow rate for slurry circulation was at 45 L/min, and while the fluid in the reactor was circulated, the fluid in the reactor was started to be stirred. The temperature inside the reactor was 30° C. After 159 hours (stirring time) from the start, the resultant fluid was dried under reduced pressure at room temperature to give a powdery electrolyte precursor. Next, this was heated at 110° C. under reduced pressure for 2 hours to remove the complexing agent having remained in the electrolyte precursor to give an amorphous solid electrolyte.

The resultant amorphous solid electrolyte was analyzed through powdery X-ray diffractometry (XRD). The residual amount of $Li_2S$ in the amorphous sulfide solid electrolyte was calculated and was 6.5%. Composition analysis was carried out by ICP (induction coupled plasma) emission spectrometry. In Example 6, the experimental condition is shown in Table 3, the measurement results are in Table 4.

Next, in the same manner as in Example 1, a crystalline sulfide solid electrolyte was obtained. The ionic conductivity of the resultant crystalline sulfide solid electrolyte was measured, and was $3.8 \times 10^{-3}$ (S/cm). Thus, the sulfide solid electrolyte was confirmed to have a high ionic conductivity. The results are shown in Table 4.

From the results in Example 6, it is confirmed that, even on a large-sized scale (for mass-production) toward industrial production with a reactor having a capacity of 600 L, the residual $Li_2S$ amount is 6.5% and is small and the reaction of the raw materials run on, and from the results of composition analysis, it is also confirmed that the composition of the resultant sulfide solid electrolyte is almost the same as that of the raw materials used with little compositional shift, and according to the production method of the present embodiment, a sulfide solid electrolyte can be efficiently produced using a liquid-phase method. Further, the ionic conductivity of the resultant sulfide solid electrolyte was $3.8 \times 10^{-3}$ (S/cm), and it is confirmed that, as compared with that in the small-scale cases of Examples 1 to 5 mentioned above, the present sulfide solid electrolyte has a more excellent ionic conductivity.

INDUSTRIAL APPLICABILITY

In accordance with the production method of the present embodiment, a sulfide solid electrolyte can be efficiently produced using a liquid-phase method. The crystalline sulfide solid electrolyte obtained according to the production method of the present embodiment is suitably used for batteries, especially batteries to be used for information-related instruments and communication instruments, such as personal computers, video cameras, and mobile phones.

REFERENCE SIGNS LIST

1. Reactor
2. Discharging Port
3. Returning Port
4. Stirrer
5. Stirring Impeller
11. Pump
12. Circulation Line
13. Valve

TABLE 3

| | Raw Materials | | | | | | Complexing Agent and Solvent | | | | Fluid Circulation | Reactor | Stirring |
|---|---|---|---|---|---|---|---|---|---|---|---|---|---|
| | | | | | | | Complexing Agent | | Solvent | | | | |
| | $Li_2S$ (kg) | $P_2S_5$ (kg) | LiBr (kg) | LiI (kg) | $Br_2$ (kg) | $I_2$ (kg) | kind | amount used L | kind | amount used L | Stirring Impeller kind | Amount L/min | Temperature ° C. | Stirring Time hr |
| Example 6 | 5.860 | 9.450 | 1.850 | 2.850 | — | — | TMEDA | 45.0 | c-Hex | 443.0 | anchor | 45 | 30 | 159 |

TABLE 4

| | Residual $Li_2S$ Amount % | Results of Composition Analysis | | | | | Ionic Conductivity (mS/cm) |
|---|---|---|---|---|---|---|---|
| | | $Li_2S$ (mol %) | $P_2S_5$ (mol %) | LiBr (mol %) | LiI (mol %) | $Li_2S/P_2S_5$ molar ratio | |
| Example 6 | 6.5 | 60.2 | 20.0 | 10.0 | 9.8 | 3.01 | 3.8 |

The invention claimed is:

1. A method for producing a sulfide solid electrolyte, comprising:
   stirring a reaction fluid in a reactor; and
   circulating the reaction fluid out of the reactor via a discharging port, through a circulation line, and back into the reactor via a returning port during stirring;
   wherein:
   the reaction fluid is obtained by combining a raw material and a complexing agent;
   the raw material comprises lithium sulfide, a phosphorus compound, and a halogen compound;
   the complexing agent contains a nitrogen atom; and
   the circulation line is not provided with a pulverizer, and a pulverizer is not used in stirring and circulating the reaction fluid.

2. The method for producing a sulfide solid electrolyte according to claim 1, wherein the raw material contains two or more kinds of solid compounds, and the density difference between the compound having a highest density and the compound having a lowest density is 1.0 g/cm$^3$ or more.

3. The method for producing a sulfide solid electrolyte according to claim 1, wherein a circulation amount per minute of the reaction fluid is 0.01 times or more and 5.0 times or less a volume of the reaction fluid in the reactor.

4. The method for producing a sulfide solid electrolyte according to claim 1, wherein a volume of the reactor is 30 L or more.

5. The method for producing a sulfide solid electrolyte according to claim 3, wherein the circulation amount per minute of the reaction fluid is 3.5 L/min or more and 100 L/min or less.

6. The method for producing a sulfide solid electrolyte according to claim 1, wherein the reaction fluid is not subjected to a pulverizing step.

7. The method for producing a sulfide solid electrolyte according to claim 1, wherein the discharging port is arranged at a bottom of the reactor.

8. The method for producing a sulfide solid electrolyte according to claim 1, wherein the returning port is below a top surface of the reaction fluid in the reactor during operation.

9. The method for producing a sulfide solid electrolyte according to claim 1, wherein a temperature in the reactor is controlled.

10. The method for producing a sulfide solid electrolyte according to claim 1, wherein one or more selected from lithium bromide (LiBr), lithium iodide (LiI) and lithium chloride (LiCl) are used as the halogen compound.

11. The method for producing a sulfide solid electrolyte according to claim 1, wherein one or more selected from bromine ($Br_2$) and iodine ($I_2$) are used as the halogen compound.

12. The method for producing a sulfide solid electrolyte according to claim 1, wherein the complexing agent has two or more amino groups.

13. The method for producing a sulfide solid electrolyte according to claim 1, wherein the complexing agent is tetramethylethylenediamine.

14. A method for producing a sulfide solid electrolyte, comprising:
   stirring a reaction fluid in a reactor; and
   circulating the reaction fluid out of the reactor via a discharging port, through a circulation line, and back into the reactor via a returning port during stirring;
   wherein:
   the reaction fluid is obtained by combining a raw material and a complexing agent that reacts with the raw material to form a complex;
   the raw material comprises lithium sulfide, a phosphorus compound, and a halogen compound; and
   the circulation line is not provided with a pulverizer, and a pulverizer is not used in stirring and circulating the reaction fluid.

* * * * *